US010652925B2

(12) United States Patent
Naguib et al.

(10) Patent No.: US 10,652,925 B2
(45) Date of Patent: May 12, 2020

(54) MEDIUM ACCESS CONTROL AND CHANNEL ACCESS FOR ACCESS OPERATIONS

(71) Applicant: Apple Inc., Cupertino, CA (US)

(72) Inventors: Ayman F. Naguib, Cupertino, CA (US); Robert W. Brumley, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 2 days.

(21) Appl. No.: 16/140,992

(22) Filed: Sep. 25, 2018

(65) Prior Publication Data
US 2020/0100283 A1    Mar. 26, 2020

(51) Int. Cl.
*H04W 74/08* (2009.01)
*H04W 12/04* (2009.01)
(Continued)

(52) U.S. Cl.
CPC ......... *H04W 74/0808* (2013.01); *B60R 25/24* (2013.01); *H04W 12/00305* (2019.01);
(Continued)

(58) Field of Classification Search
CPC ............ H04W 74/0808; H04W 56/001; H04L 12/003; H04L 12/00305
See application file for complete search history.

(56) References Cited

U.S. PATENT DOCUMENTS

2009/0201877 A1* 8/2009 Noh ...................... H04L 5/0007
370/330
2010/0141381 A1* 6/2010 Bliding .............. G07C 9/00309
340/5.61
(Continued)

FOREIGN PATENT DOCUMENTS

WO    2007021292 A2    2/2007

OTHER PUBLICATIONS

Extended European Search Report; Application No. EP19194308.3-1215 dated Jan. 30, 2020, 8 pages.
(Continued)

*Primary Examiner* — Gary Mui
(74) *Attorney, Agent, or Firm* — Dickinson Wright RLLP

(57) ABSTRACT

Methods and apparatus to support channel access control for keyless vehicle entry systems are disclosed. An initiating central wireless device of a wireless personal area network (WPAN) queries multiple responding peripheral wireless devices to perform ranging for distance and/or angle of arrival data, where the multiple peripheral wireless devices coordinate responses to minimize interference, avoid overlapping transmissions, and reduce time to complete ranging. Ranging frames are divided into multiple ranging time slots, where each ranging time slot can accommodate a full ranging cycle between the central and peripheral wireless devices. The central wireless device determines which ranging time slot to use based on estimates of communication channel interference and on a number of received responses from the peripheral wireless devices. Ranging measurements are provided to a controller of a vehicle that houses the peripheral wireless devices to determine whether to permit vehicle access.

20 Claims, 16 Drawing Sheets

(51) Int. Cl.
  *B60R 25/24* (2013.01)
  *H04W 12/00* (2009.01)
  *H04W 56/00* (2009.01)
  *G07C 9/00* (2020.01)
(52) U.S. Cl.
  CPC ......... *H04W 12/04* (2013.01); *H04W 56/001* (2013.01); *G07C 9/00007* (2013.01); *H04L 2209/80* (2013.01)

(56) References Cited

U.S. PATENT DOCUMENTS

| | | | |
|---|---|---|---|
| 2010/0202303 A1 | 8/2010 | Gu et al. | |
| 2011/0051687 A1* | 3/2011 | Nakasato | H04W 36/30 370/331 |
| 2011/0070825 A1* | 3/2011 | Griffin | H04B 5/0031 455/41.1 |
| 2016/0127473 A1* | 5/2016 | Khan | H04L 67/12 455/66.1 |
| 2017/0026910 A1* | 1/2017 | Scheim | H04W 52/0245 |
| 2017/0078954 A1* | 3/2017 | Zakaria | H04W 48/16 |
| 2018/0099643 A1* | 4/2018 | Golsch | H04W 48/04 |
| 2018/0213492 A1* | 7/2018 | Xia | H04W 56/001 |
| 2018/0234911 A1* | 8/2018 | Zhao | H04W 72/04 |
| 2019/0208387 A1* | 7/2019 | Jiang | H04W 4/46 |
| 2019/0261173 A1* | 8/2019 | Tailor | H04W 12/00305 |

OTHER PUBLICATIONS

Karapistoli et al. "An Overview of the IEEE 802.15.4a Standard", IEEE Communications Magazine, IEEE Service Center, Piscataway, U.S. vol. 48, No. 1, Jan. 1, 2010, pp. 47-53.

Kocks et al. "A Low-Cost Protocol and Application for UWB Localization, Exploiting Cross-Layer Design and Cognitive Radio Aspects", Cognitive Radio and Advanced Spectrum Management, May 19, 2009, pp. 35-39.

* cited by examiner

MEDIUM ACCESS CONTROL AND CHANNEL ACCESS FOR ACCESS OPERATIONS

FIELD

The described embodiments relate generally to wireless communication, including methods and apparatus to support channel access control for keyless vehicle entry systems. An initiating central wireless device can query multiple responding peripheral wireless devices to perform ranging for distance and/or angle of arrival data, where the multiple peripheral wireless devices coordinate responses to minimize interference and reduce time to complete ranging.

BACKGROUND

Recent technological advances have integrated multiple wireless radio access technologies (RATs) into single, multi-functional wireless devices. Specialized single-function wireless devices are being replaced and/or supplemented by multi-functional wireless devices that can communicate using the various RATs. In addition, electronic communications capabilities are being integrated into a broad range of systems, including those that use traditional mechanical functions, such as vehicle entry control. A vehicle can include multiple peripheral wireless devices that can communicate with an initiating wireless device to assist with vehicle entry. One-to-one, individual, uncoordinated communication between the peripheral wireless devices and the initiating wireless device can result in overlapping communication and can extend the time needed to detect, verify, and allow for vehicle access (or entry). Wireless personal area networks for different vehicles can also overlap in area coverage resulting in additional interference.

SUMMARY

The described embodiments relate generally to wireless communication, including methods and apparatus to support channel access control for keyless vehicle entry systems. An initiating wireless device can query multiple responding peripheral wireless devices to perform ranging for distance and/or angle of arrival data, where the multiple peripheral wireless devices coordinate responses to reduce or minimize interference and reduce time to complete ranging.

Methods, devices, and apparatus to coordinate channel access by a central wireless device that communicates with multiple peripheral wireless devices. The peripheral wireless devices, in some embodiments, can be housed in a vehicle and communicate with a centralized controller that performs vehicle entry access control for the vehicle. The central wireless device, in some embodiments, can include a cellular wireless phone or a wearable computing device. The central wireless device broadcasts ranging measurement messages to the multiple peripheral wireless devices, which reply with ranging measurement responses in a coordinated manner during sequential, non-overlapping segments of a ranging time slot. An order in which the multiple peripheral wireless devices respond can be determined during a setup phase, such as during establishment of and/or subsequent communication via a wireless personal area network (WPAN) that includes the central wireless devices and the multiple peripheral wireless devices, or by communicating the order in a broadcast message by the central wireless device at the start of a ranging cycle. A local time reference at the peripheral wireless devices can be based at least in part on time stamp information provided in the broadcast ranging measurement message. Measurement data obtained by the peripheral wireless devices based at least in part on reception of the broadcast measurement ranging message(s) can be provided to the central wireless device, which can determine a distance (such as based on a time-of-flight measurement) and/or direction (such as based on an angle-of-arrival measurement) between the central wireless device and the peripheral wireless devices. Measurement data obtained by the central wireless device based on measurement response messages received from the multiple peripheral wireless devices can also be communicated from the central wireless device back to the peripheral wireless devices. In some embodiments, a centralized controller of a vehicle housing the peripheral wireless devices controls vehicle access (or entry) based at least in part on measurement information provided by the peripheral wireless devices.

Multiple time slots may be available within a ranging frame, of which a single time slot is selected by the central wireless device for ranging communication with the peripheral wireless devices. In some embodiments, the central wireless device determines which of the multiple time slots to use in a subsequent ranging frame based at least in part on an estimate of interference experienced by the current ranging frame (and/or a history of ranging frames). Exemplary estimates of interference include measurements of signal-to-noise plus interference ratio (SINR) and a count of the number of measurement responses received from the multiple peripheral wireless devices. During each sequential ranging frame, the central wireless device can choose to remain in a current time slot during the next ranging frame, move to an adjacent time slot in the next ranging frame, or jump to a random time slot in the next ranging frame. In some embodiments, the central wireless device uses a pseudo-random number generation algorithm to determine the random time slot for a ranging frame. A pseudo-random hopping pattern can be generated based at least in part on a seed number determined when establishing and/or by subsequent communication over the WPAN. The peripheral wireless devices can also determine which time slot of a ranging frame in which to listen for and respond to broadcast ranging measurement messages from the central wireless device based at least in part on an indication of which time slot provided by the central wireless device. The peripheral wireless devices can also use the same pseudo-random number generation algorithm as the central wireless device to determine a random time slot. In some embodiments, the central wireless device and the peripheral wireless devices communicate ranging measurement messages and responses using an ultra-wideband (UWB) wireless communication protocol.

Other aspects and advantages of the present disclosure will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
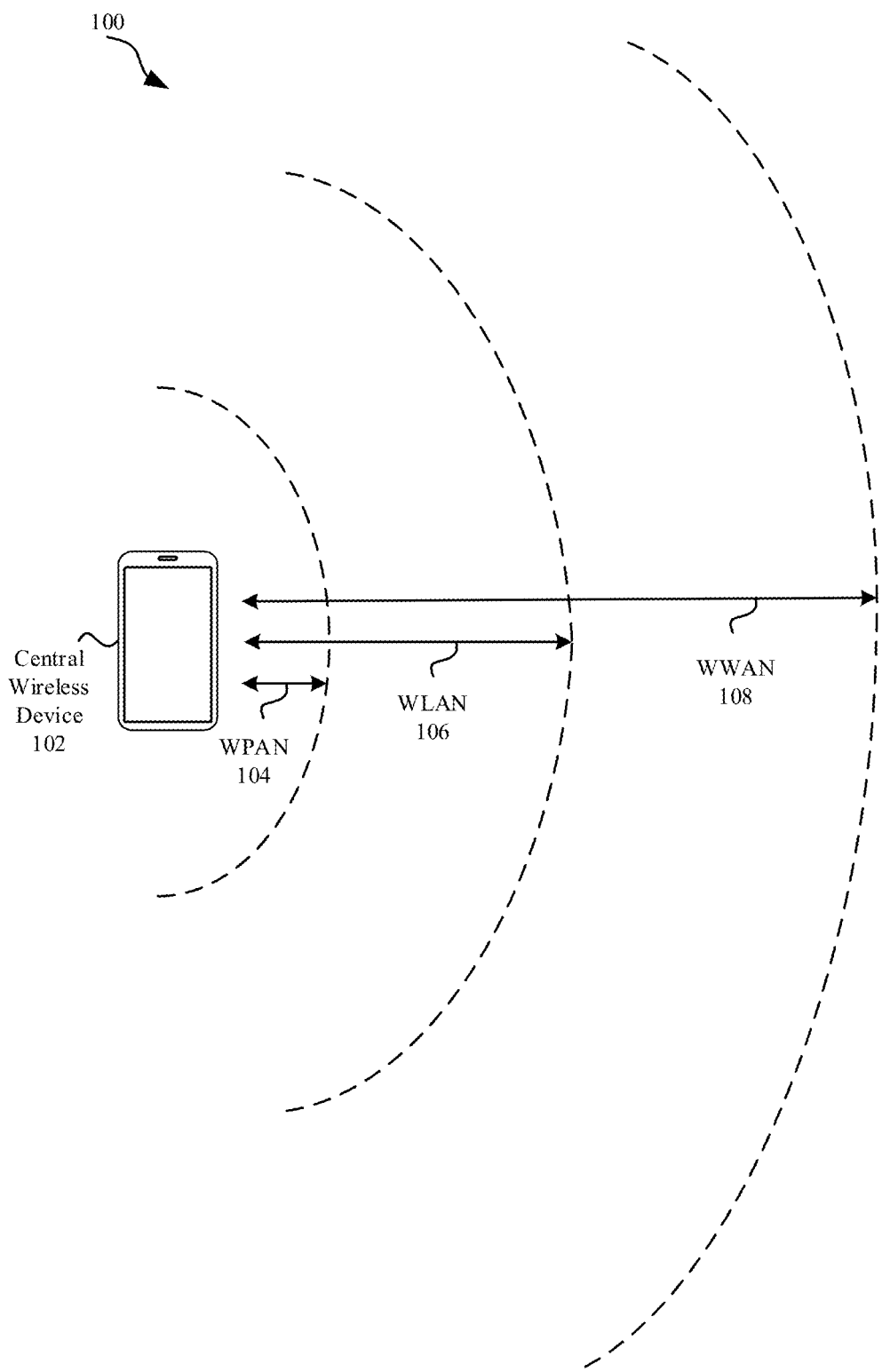
FIG. 1 illustrates an exemplary wireless device configurable to communicate with a variety of radio access technologies, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments relate generally to wireless communication, including methods, devices, and apparatus to support coordinated channel access control for keyless entry systems (e.g., keyless vehicle entry systems). A central wireless device can query multiple peripheral wireless devices to perform ranging for distance and/or angle of arrival data, where the multiple peripheral wireless devices coordinate responses to reduce or minimize interference and reduce time to complete ranging. A time-slotted channel hopping architecture is used to allow the initiating wireless device to communicate with the multiple peripheral wireless devices using a low-power, high-bandwidth radio, such as an ultra-wideband (UWB) radio to perform the ranging function. Information gathered by receiving devices can be communicated to the transmitting devices for use in performing the ranging function. Measurement response messages from the multiple peripheral wireless devices received by the initiating device can be used to determine ranging data by the initiating device, which can communicate the ranging data back to the multiple peripheral wireless devices. In some embodiments, the multiple peripheral wireless devices are housed in a common system, e.g., as part of a vehicle entry system, and can communicate ranging data to a central controller for determination of whether to allow access based on communication received from the initiating device. The initiating device and the multiple peripheral wireless devices can form a wireless personal area network (WPAN), e.g., based on a Bluetooth Low Energy (BTLE) or Bluetooth Classic wireless communication protocol.

The central wireless device, in some embodiments, can include a cellular wireless phone or a wearable computing device. The central wireless device broadcasts ranging measurement messages to the multiple peripheral wireless devices, which reply with ranging measurement responses in a coordinated manner during sequential, non-overlapping segments of a ranging time slot. An order in which the multiple peripheral wireless devices respond can be determined during a setup phase, such as during establishment of and/or subsequent communication via the WPAN, or by communicating the order in a broadcast message by the central wireless device at the start of a ranging cycle. The central wireless device can communicate time information, e.g., time stamp(s), for its local time reference to the peripheral wireless devices in one or more broadcast ranging measurement messages, and the peripheral wireless devices can align their local time reference based at least in part on time stamp information provided in the broadcast ranging measurement message. Measurement data obtained by the peripheral wireless devices based at least in part on reception of the broadcast measurement ranging message(s) can be provided to the central wireless device, which can determine a distance (such as based on a time-of-flight measurement) and/or direction (such as based on an angle-of-arrival measurement) between the central wireless device and the peripheral wireless devices. Measurement data obtained by the central wireless device based on measurement response messages received from the multiple peripheral wireless devices can also be communicated from the central wireless device back to the peripheral wireless devices. In some embodiments, a centralized controller of a vehicle housing the peripheral wireless devices controls vehicle access based at least in part on measurement information provided by the peripheral wireless devices.

Ranging communication can be structured based on ranging frames that include multiple time slots, where the initiating central wireless device selects a ranging time slot for a ranging frame. Multiple time slots are available within a ranging frame, of which a single time slot is selected by the central wireless device for ranging communication with the peripheral wireless devices. In some embodiments, the central wireless device determines which of the multiple time slots to use in a subsequent ranging frame based at least in part on an estimate of interference experienced by the central wireless device during the current ranging frame (and/or during a history of ranging frames). Exemplary estimates of interference that can be used by the central wireless device include measurements of signal-to-noise plus interference ratio (SINR) and a count of the number of measurement responses received from the multiple peripheral wireless devices. The central wireless device can determine whether to remain in a ranging time slot in a subsequent ranging frame or to switch time slots in the subsequent ranging frame. During each sequential ranging frame, the central wireless device can choose to (i) remain in a current time slot during the next ranging frame, (ii) move to an adjacent time slot in the next ranging frame, or (iii) jump to a random time slot in the next ranging frame. In some embodiments, the central wireless device uses a pseudo-random number generation algorithm to determine a random time slot for a ranging frame. A pseudo-random hopping pattern can be generated based at least in part on a seed number determined when establishing the WPAN between the central wireless device and the multiple peripheral wireless devices and/or by subsequent communication over the WPAN. The peripheral wireless devices can also determine which time slot of a ranging frame in which to listen for and respond to broadcast ranging measurement messages from the central wireless device based at least in part on an indication of which time slot will be used in a subsequent ranging frame provided by the central wireless device. The peripheral wireless devices can also use the same pseudo-random number generation algorithm as the central wireless device to determine a random time slot. In some embodiments, the central wireless device and the peripheral wireless devices communicate ranging measurement messages and ranging response messages using an ultra-wideband (UWB) wireless communication protocol.

Different initiating central wireless devices can seek to communicate with the multiple peripheral wireless devices, and each central wireless device can establish its own WPAN with the multiple peripheral wireless devices. Different initiating central wireless devices can also seek to communicate with different sets of multiple peripheral wireless devices, e.g., where a first set of multiple peripheral wireless devices is housed in a first vehicle, and a second set of multiple peripheral wireless devices is housed in a second vehicle. UWB ranging communication for a central wireless device to its respective multiple peripheral wireless devices can be uncoordinated, e.g., with respect to UWB ranging communication performed by other central wireless devices. With multiple time slots available in each ranging frame, and with time slot hopping, interference between different central wireless devices seeking to communicate with the same or with different peripheral wireless devices can be reduced or minimized without requiring coordination between them.

These and other embodiments are discussed below with reference to FIGS. 1-10; however, those skilled in the art will readily appreciate that the detailed description given herein with respect to these figures is for explanatory purposes only and should not be construed as limiting.

FIG. 1 illustrates a diagram 100 of an exemplary set of overlapping wireless networks for a wireless device 102. The wireless device 102 can include a combination of hardware and software to provide wireless connections using one or more different wireless networks alone, separately, or in combination, such as via the set of overlapping networks. The wireless device 102 can represent a device having wireless communications capabilities, such as a smart phone (e.g., an iPhone®), a tablet device (e.g., an iPad®), a wearable computing device (e.g., an Apple Watch™), a portable media player (e.g., an iPod®), a laptop computer (e.g., a MacBook®), a desktop computer (e.g., an iMac®), a digital media server/extender (e.g., an Apple TV®), among other possible devices.

The wireless device 102 can include a combination of hardware, software, and/or firmware to provide communication using a wireless personal area network (WPAN) 104, which can provide power efficient connections while operating over a limited distance. WPAN 104 connections can typically provide for connecting the wireless device 102 to peripheral and associated wireless devices, such as headsets, earpieces, supplemental display devices, and supplemental input/output devices, for example. A representative WPAN 104 can operate in accordance with a communication protocol specified by the Bluetooth SIG, for example Bluetooth Classic and/or Bluetooth Low Energy (BTLE), and/or by Apple Inc. such as an Apple Wireless Direct Link (AWDL). The wireless device 102 can also include a combination of hardware, software, and/or firmware to provide communication using a low-power, wide-bandwidth wireless communication protocol, such as an ultra-wideband (UWB) wireless communication protocol. The wireless device 102 can use the UWB wireless communication protocol to communicate ranging measurement messages to peripheral wireless devices and receive ranging response messages in order to determine a distance and/or angle of arrival for communication between the wireless device 102 and the peripheral wireless devices. The area covered by the UWB communication can be similar to an extent of the WPAN 104. For simplicity of illustration, the UWB communication area is assumed to be approximately coincident with the WPAN 104. In some cases, the UWB communication area can be less than the area covered by the WPAN 104 or more than the area covered by the WPAN 104.

The wireless device 102 can also include a combination of hardware, software, and/or firmware to provide communication using a WLAN 106 that can provide a higher data rate and a greater operating range than a WPAN 104. The wireless device 102 can include separate and/or shared hardware, software, and/or firmware elements for the WPAN 104 and the WLAN 106. Both the WPAN 104 and WLAN 106 can operate as "local" wireless networks. A representative WLAN 106 can operate in accordance with a communication protocol specified by the Institute of Electrical and Electronic Engineers (IEEE), such as the IEEE 802.11 family of wireless standards, which in some versions can also be referred to as Wi-Fi.

The wireless device 102 can also include additional hardware, software, and/or firmware to provide a WWAN 108 capability, such as to interconnect with one or more cellular wireless networks. The wireless device 102 can provide a multitude of services using one or more connections through its wireless networking capabilities.

Figure 2:
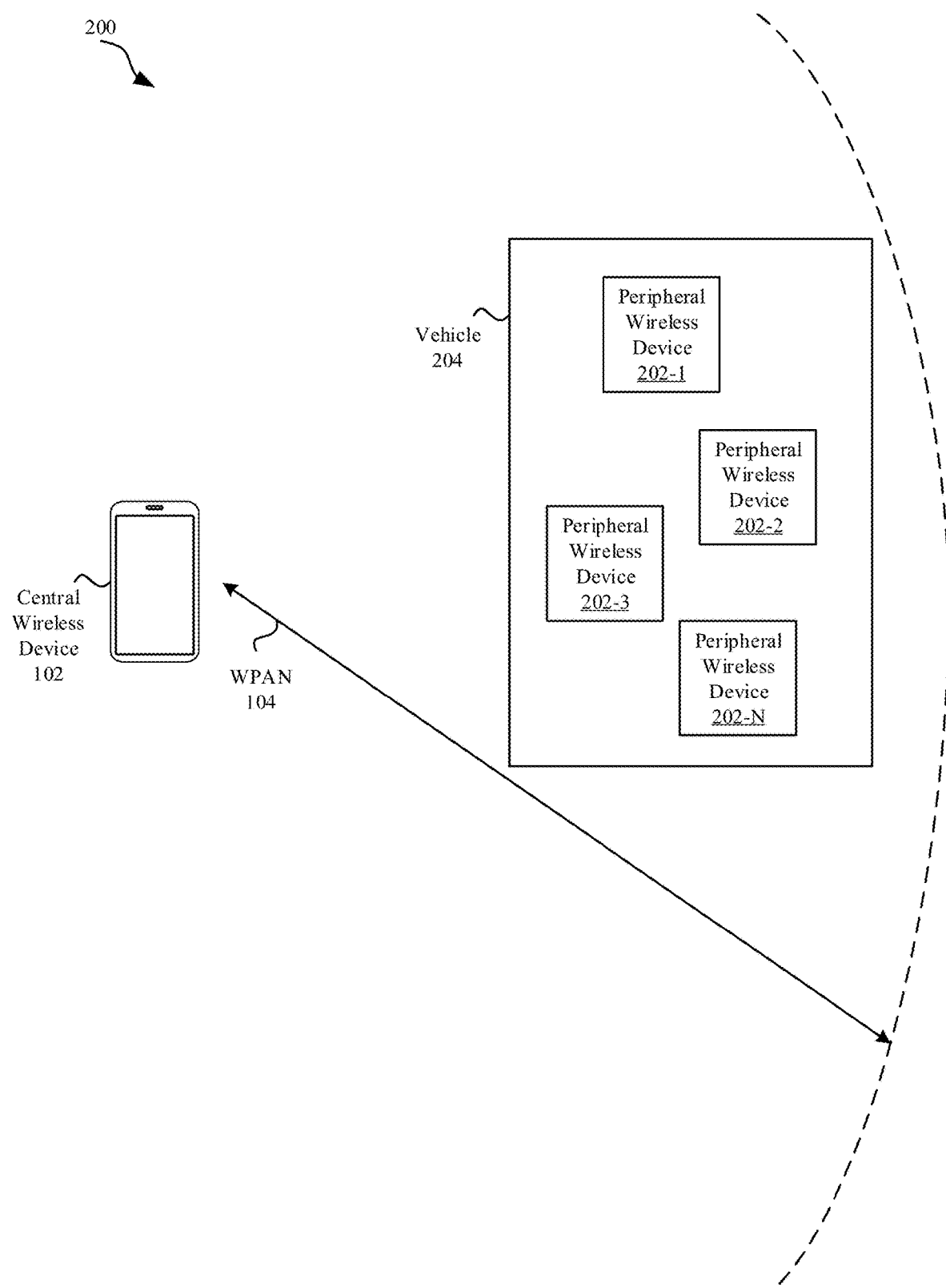
FIG. 2 illustrates an exemplary wireless personal area network (WPAN) system including a central wireless device and multiple peripheral wireless devices housed in a vehicle, in accordance with some embodiments.

FIG. 2 illustrates a diagram 200 of an exemplary wireless personal area network (WPAN) 104 system including a central wireless device 102 and multiple peripheral wireless devices 202-1 to 202-N housed in a vehicle 204. The central wireless device 102 can establish the WPAN 104 with the multiple peripheral wireless devices 202-1 to 202-N, e.g., using a Bluetooth Low Energy (BTLE) and/or Bluetooth (BT) Classic wireless communication protocol. The central wireless device 102 can establish parameters for the multiple peripheral wireless devices 202-1 to 202-N to use for ranging by communicating information through via WPAN 104. Parameters can include a ranging time slot hopping algorithm, a seed for a pseudo-random number algorithm to determine a random hopping pattern to select different time slots in different ranging frames, and an order in which different peripheral wireless devices 202 can communicate to avoid overlapping interference between them. Both the central wireless device 102 and the multiple peripheral wireless devices 202 can use the same time slot hopping algorithm and the same initial seed to determine a random hopping pattern to use when randomly changing time slots. Ranging communication is confined to a particular selected time slot of multiple time slots available in a ranging frame. Within the selected time slot, the multiple peripheral wireless devices 202 communicate in non-overlapping sequential segments of the ranging time slot, each of the peripheral wireless devices 202 are assigned a particular order in which to communicate and therefore communication by different peripheral wireless devices 202 do not overlap within the ranging time slot of the ranging frame. In some embodiments, the central wireless device 102 communicates timing information via the WPAN 104 to the peripheral wireless devices 202 to establish a level of timing synchronization with the peripheral wireless devices 202. In some embodiments, ranging communication by the central wireless device 102 and the peripheral wireless devices 202 uses an ultra-wideband (UWB) wireless communication protocol that is separate from a wireless communication protocol used for the WPAN 104, such as BTLE or BT Classic.

Figure 3:
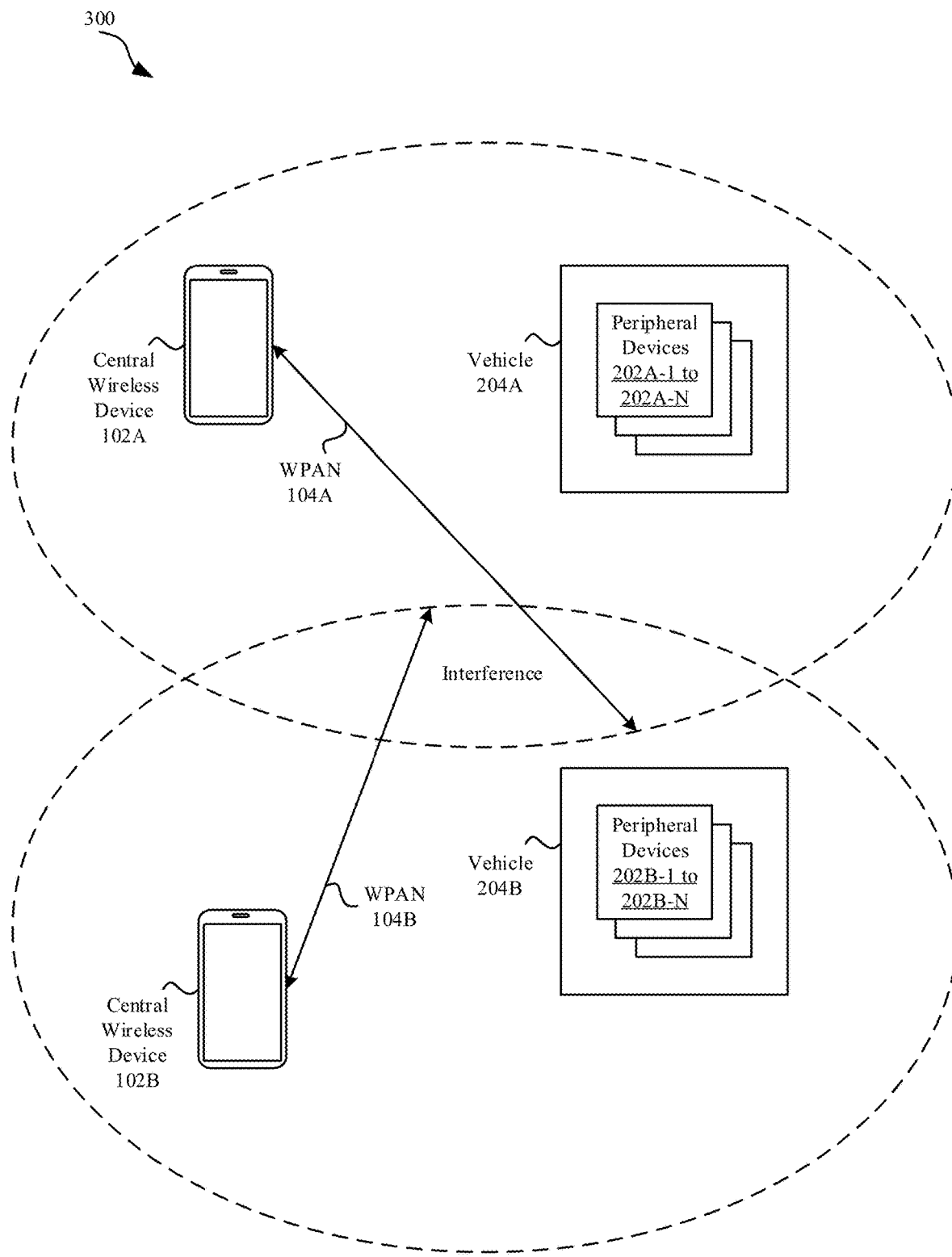
FIG. 3 illustrates an example of two overlapping WPAN systems subject to potential interference between them, in accordance with some embodiments.

FIG. 3 illustrates a diagram 300 of an example of two overlapping WPAN 104 systems subject to potential interference between them. A first central wireless device 102A establishes a first WPAN 104A with a first set of peripheral wireless devices 202A-1 to 202A-N, which are housed in a vehicle 204A, while a second central wireless device 102B establishes a separate second WPAN 104B with a second set of peripheral wireless devices 202B-1 to 202B-N, which are housed in a separate vehicle 204B. Communication via WPAN 104A and UWB ranging communication between the central wireless device 102A and the first set of peripheral wireless devices 202A-1 to 202A-N can be separate from and not coordinated with communication via WPAN 104B and UWB ranging communication between the central wireless device 102B and the second set of peripheral wireless devices 202B-1 to 202B-N. As such, communication by either central wireless device with their respective peripheral wireless devices (and vice versa) can interfere with communication by the other central wireless device with its respective peripheral wireless devices (and vice versa). UWB ranging communication can use a time-slotted wireless communication protocol in which ranging frames include multiple sequential time slots available for the UWB ranging communication, with a central wireless device, e.g., the central wireless device 102A, and associated peripheral wireless devices, e.g., the set of peripheral wireless devices 202A-1 to 202A, each selecting a single time slot within a given ranging frame to communicate their UWB ranging messages. UWB ranging communication by the other central wireless device 102B with the other set of peripheral wireless devices 202B-1 to 202B-N can also select a single time slot within a given ranging frame to communicate their UWB ranging messages. The ranging time slots can be selected independently, and the ranging frames used by each set of devices need not be aligned. If interference occurs, either central wireless device 102A or 102B (or both) can select a different time slot in a subsequent ranging frame to mitigate the interference. As discussed further herein, determination of whether to change time slots and when changing time slots how to move, e.g., randomly to another time slot or to an adjacent time slot, can be determined by the central wireless device 102A or 102B based on estimates of interference, e.g., measured SINR, and/or based on responses received (or a lack thereof) from the peripheral wireless devices 202A-1 to 202A-N or 202B-1 to 202B-N.

Figure 4A:
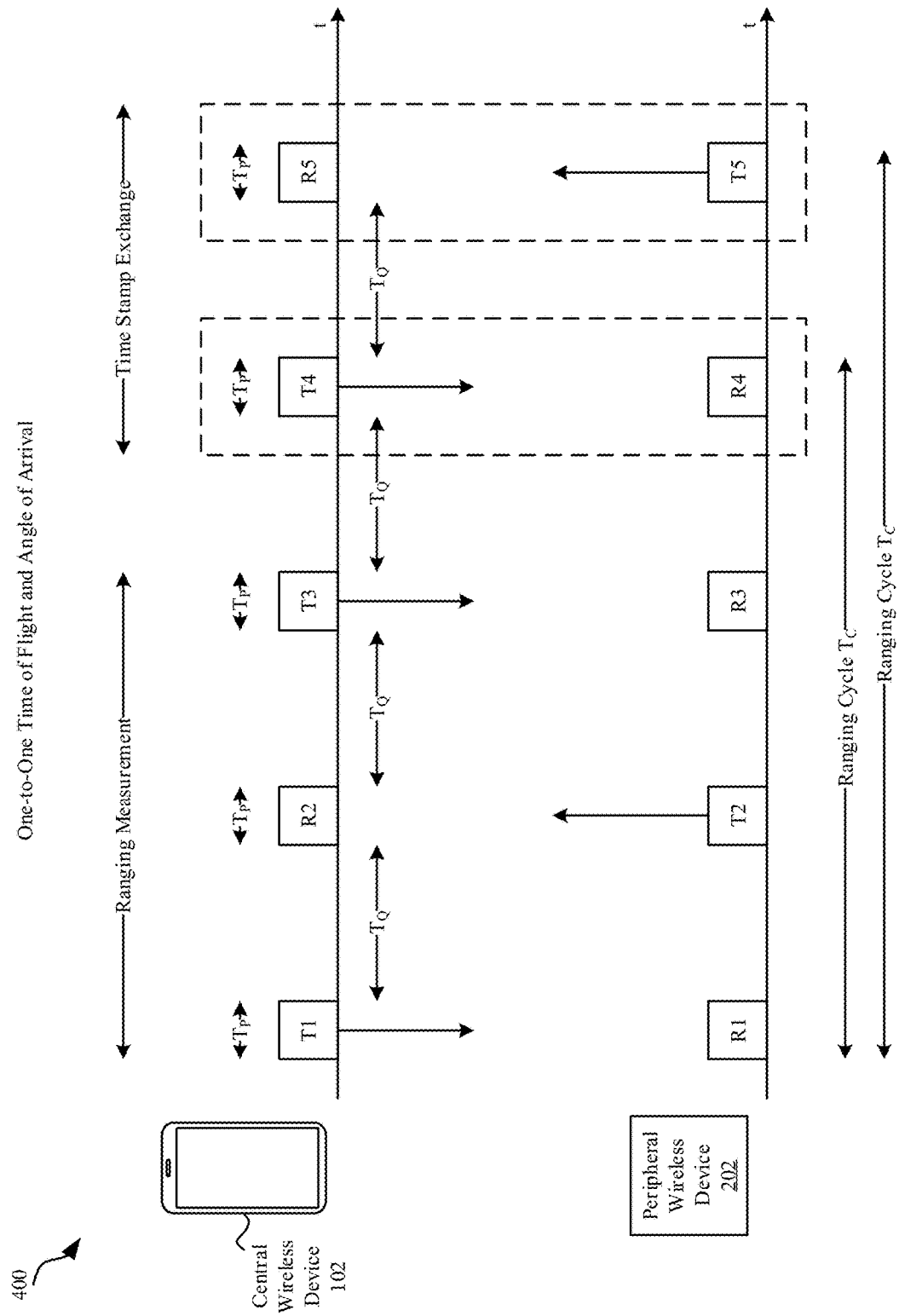
FIGS. 4A and 4B illustrate exemplary sequences of ranging messages between a central wireless device and a peripheral wireless device, in accordance with some embodiments.

FIG. 4A illustrates a diagram 400 of an exemplary sequence of ranging messages communicated between a central wireless device 102 and peripheral wireless device 202. The ranging messages can be used by either side to perform a time of flight and/or an angle of arrival ranging measurement. The sequence of ranging messages spans a total time period that defines a ranging cycle $T_C$, which includes a first time period, during which ranging measurements are performed by the central wireless device 102 and by the peripheral wireless device 202, followed by a second time period, during which results of the ranging measurements are exchanged between the central wireless device 102 and the peripheral wireless device 202. The central wireless device 102 sends a ranging measurement message, indicated as T1, which consists of a pulse of width $T_P$, to the peripheral wireless device 202, reception of which is indicated as R1. The peripheral wireless device 202, responsive to receipt of the ranging measurement message T1, sends a measurement response message, indicated as T2, which also consists of a pulse of width $T_P$, to the central wireless device 102, reception of which is indicated as R2. Ranging measurement messages and ranging response messages are separated by a time period $T_Q$. The ranging measurement and ranging response messages can include time stamp information indicating a time at which the message is sent. The receiving end can use the time stamp information and a local clock to determine a time of flight for the message in order to estimate a distance between the receiving device and the sending device. The central wireless device 102 can also send a second ranging measurement message, indicated as T3, to the peripheral wireless device 202, reception of which is indicated as R3. The first and second ranging measurement messages together can allow the peripheral wireless device 202 to assess time clock drift for more accuracy in estimating ranging. Each side that receives messages can use information obtained from one or more of the messages to perform ranging measurements and communicate ranging measurement results to the other side.

The ranging measurement results can include, in some embodiments, time stamp information for when particular ranging measurement messages are received, e.g., a time stamp for when the peripheral wireless device 202 receives a broadcast ranging measurement message from the central wireless device 102, or a time stamp for when the central wireless device 102 receives a measurement response message from the peripheral wireless device 202. The time stamp exchange can include communication from the central wireless device 102 to the peripheral wireless device 202 of measurement information, e.g., time stamps, where the peripheral wireless device 202 can use the measurement information for additional actions. The time stamp exchange can also include communication from the peripheral wireless device 202 to the central wireless device 102, e.g., time stamps, where the central wireless device 102 can use the measurement information for additional actions. The time stamp exchange can be unidirectional in some embodiments, such as when only one side uses the ranging measurement information for additional actions. The time stamp exchange can also be bidirectional in some embodiments, such as when both sides use the ranging measurement information for additional actions. A ranging cycle $T_C$ having a unidirectional time stamp exchange can be shorter in time than a ranging cycle $T_C$ having a bidirectional time stamp exchange.

Figure 4B:
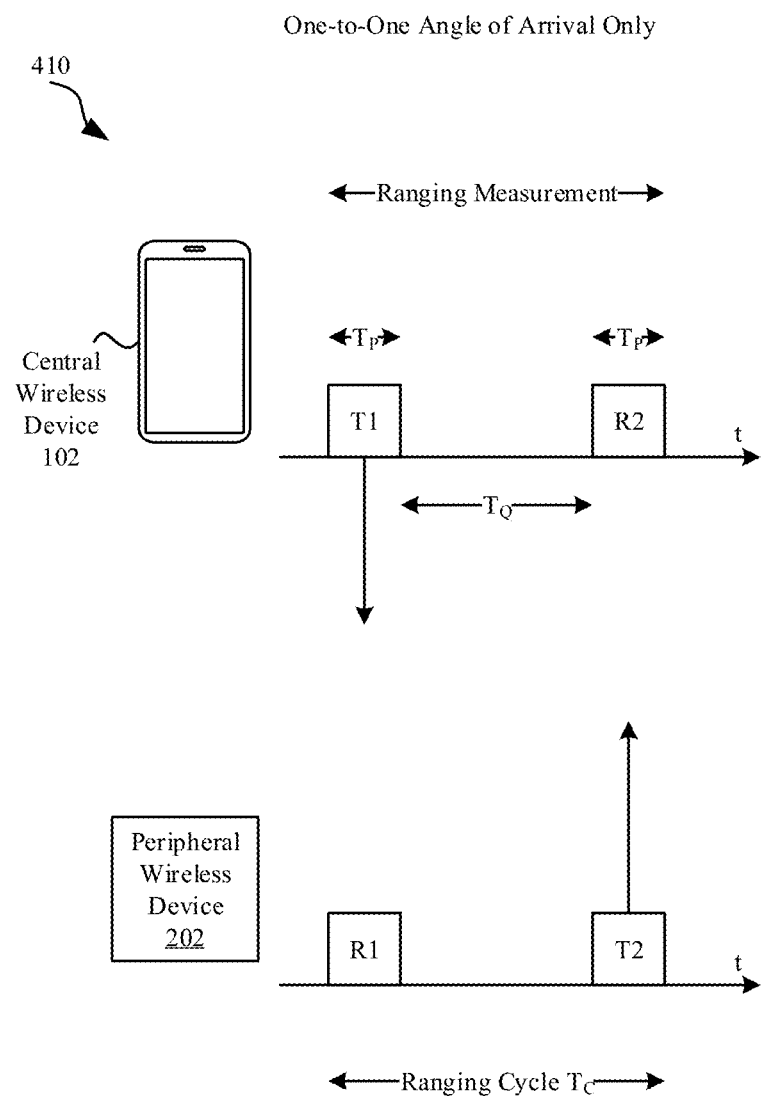

FIG. 4B illustrates a diagram 410 of an exemplary sequence of ranging messages communicated between a central wireless device 102 and peripheral wireless device 202 that can be used for angle of arrival only. A single ranging measurement message, indicated as T1, is sent by the central wireless device 102 to the peripheral wireless device 202, receipt of which is indicated as R1. Responsive to receipt of the ranging measurement message T1 from the central wireless device 102, the peripheral wireless device sends a ranging response message, indicated as T2, to the central wireless device 102, receipt of which is indicated as R2. The two ranging messages are each a pulse of width $T_P$ and are separated by a time $T_O$. The ranging measurement cycle spans a total time $T_C$. With single ranging measurement messages sent a received in each direction, only angle of arrival is calculated by each receiving end individually, and time stamp information for reception of messages is not subsequently sent, i.e., no time stamp exchange for the sequence illustrated in FIG. 4B. The ranging message exchanges illustrated in FIGS. 4A and 4B are between a single central wireless device 102 and a single peripheral wireless device 202. While the single central wireless device 102 could perform ranging with multiple peripheral wireless devices 202 by repeating the one-to-one sequence of ranging messages shown in FIG. 4A or 4B for each peripheral wireless device 202 individually, the total time increases to complete ranging for all peripheral wireless devices 202 increases linearly with the number of peripheral wireless devices 202. A coordinated sequence of messages as described further here provides for a more time-efficient exchange of ranging messages.

Figure 4C:
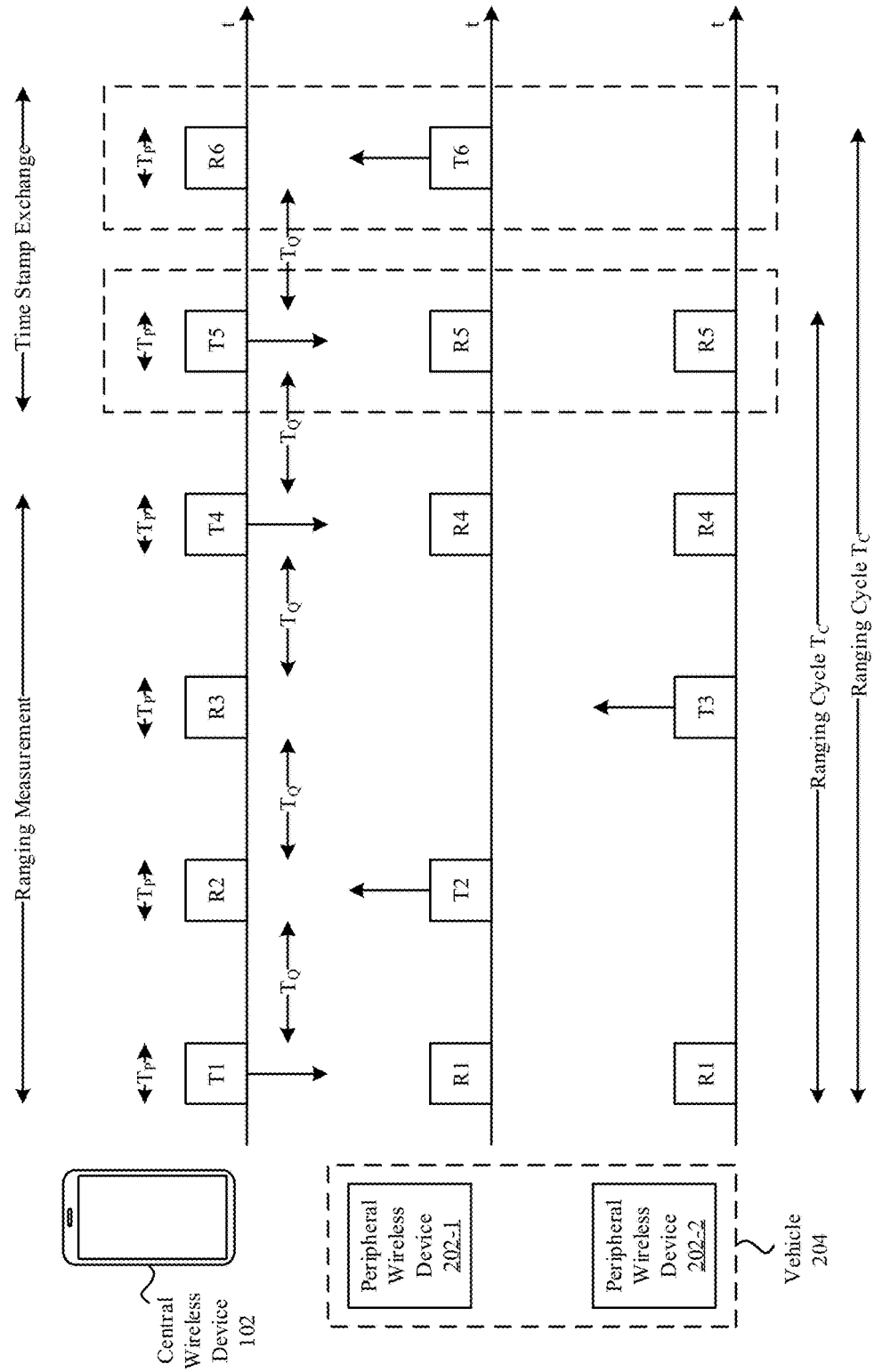
FIGS. 4C, 4D, and 4E illustrate exemplary sequences of ranging messages between a central wireless device and multiple peripheral wireless devices, in accordance with some embodiments.

FIG. 4C illustrates a diagram 420 of an exemplary sequence of ranging messages communicated between a central wireless device 102 and two peripheral wireless devices 202-1, 202-2. A central wireless device 102 initiates the ranging by broadcasting a first ranging measurement message T1, which can be received by the two peripheral wireless devices 202-1, 202-2, which each respond according to a pre-determined order by individually sending ranging response messages at distinct, non-overlapping time periods. The first peripheral wireless device 202-1 responds with a ranging response message T2 followed by the second peripheral wireless device 202-2 with a ranging response message T3. The order in which the peripheral wireless devices 202-1, 202-2 respond can be determined based on information communicated when establishing a WPAN 104 that includes the central wireless device 102 and the peripheral wireless devices 202-1, 202-2 or subsequently communicated via the WPAN 104. Alternatively, and/or additionally, the order for responses by peripheral wireless devices 202-1, 202-2 can be communicated in the broadcast ranging measurement message T1 sent by the central wireless device 102 at the start of the ranging measurement cycle. Responses by the peripheral wireless devices 202-1, 202-2 can be coordinated to occur at different, non-overlapping time periods. The central wireless device 102 can listen for responses from each of the multiple peripheral wireless devices 202-1, 202-2. Subsequently, the central wireless device 102 broadcasts a second ranging measurement message T4, which can be received by each of the peripheral wireless devices 202-1, 202-2. The combination of the first ranging measurement message T1 and the second ranging measurement message T4 can allow for more accurate time of flight measurements for the ranging function.

In some embodiments, the peripheral wireless devices 202-1, 202-2 are housed in a common system, e.g., a vehicle that includes an access controller (not shown) that can accumulate information gathered by the peripheral wireless devices 202-1, 202-2 during the ranging cycle to determine whether to perform an action, such as whether to allow for vehicle entry (or other access). After the ranging measurement time period, the central wireless device 102 communicates ranging measurement information obtained by the central wireless device 102, such as time stamp information for ranging response messages received by the central wireless device 102, to the peripheral wireless devices 202-1, 202-2. Representative time stamp information can include a time stamp for when a ranging response message is sent (which can be included in the ranging response message when sent) and/or a time stamp for when a ranging response message is received. In some embodiments, time stamp information is also provided by one of the peripheral wireless devices, e.g., peripheral wireless device 202-1, to the central wireless device 102, which can use the time stamp information to perform ranging estimation and/or determine whether to perform various actions. In some embodiments, each of the peripheral wireless devices 202-1, 202-2 use information from the ranging measurement messages T1, T4 and the time stamp exchange message T5 to perform a ranging estimation, e.g., estimate a location (distance, and/or directional angle) of the central wireless device 102. In some embodiments, the peripheral wireless devices 202-1, 202-2 provide measurement data and/or ranging estimates to a central controller to use to determine whether to perform one or more actions. In some embodiments, the central controller determines whether to permit entry (or other access) to a vehicle that houses the peripheral wireless devices 202-1, 202-2 based at least in part on the information communicated by the peripheral wireless devices 202-1, 202-2 and derived from the ranging exchange. The one-to-many sequence of messages shown in FIG. 4C reduces a time for the initiating central wireless device 102 to communicate to multiple peripheral wireless devices 202, as the same message is communicated to all peripheral wireless devices 202 at the same time rather than individually as in a one-to-one sequence as shown in FIGS. 4A and 4B. Broadcasting one message by the central wireless device 102 to all peripheral wireless devices 202 also reduces measurement variation due to movement of the central wireless device 102 during the ranging measurement. While FIG. 4C illustrates a vehicle 204 housing two peripheral wireless devices 202-1, 202-2, the one-to-many ranging sequence illustrated can be extended to any number of peripheral wireless devices 202, with each responding individually in an order known in advance or communicated in the initial ranging measurement message T1 from the central wireless device 102.

Figure 4D:
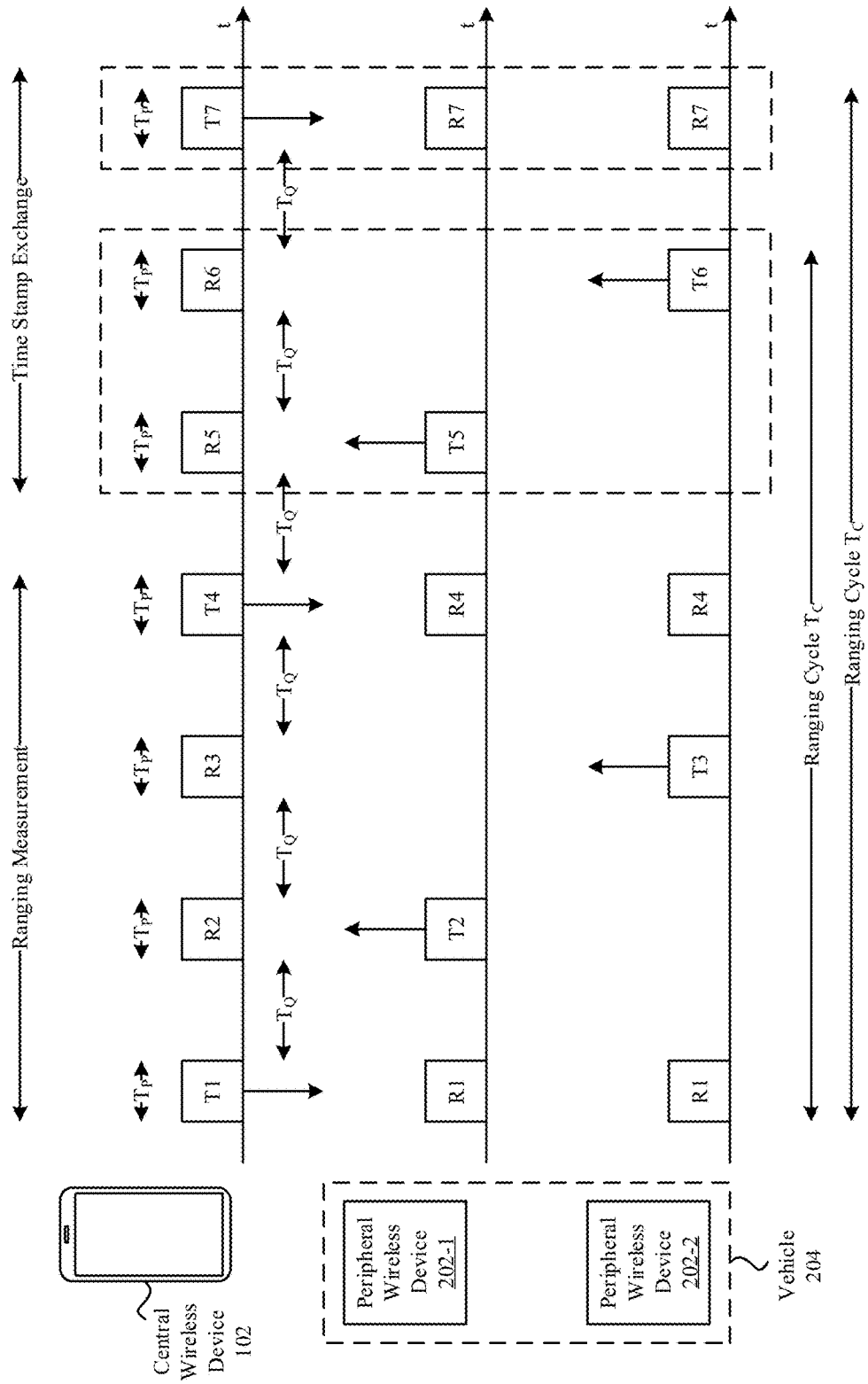

FIG. 4D illustrates a diagram 430 of another exemplary sequence of ranging messages communicated between a central wireless device 102 and two peripheral wireless devices 202-1, 202-2. The ranging measurement portion of the ranging sequence illustrated in FIG. 4D is identical to the ranging measurement portion of the ranging sequence illustrated in FIG. 4C; however, the time stamp exchange shown in FIG. 4D includes each of the peripheral wireless devices 202-1, 202-2 communicating respective time stamp information to the central wireless device 102 individually. The order in which the peripheral wireless devices 202-1, 202-2 provide the time stamp information following the second ranging measurement message T4 can follow the same order as when the peripheral wireless devices 202-1, 202-2 respond to the initial ranging measurement message T1, or can be any other order. In some embodiments, the central wireless device 102 collects ranging measurement information from one or more (including possibly up to all) of the peripheral wireless devices 202-1, 202-2, e.g., as shown by reception R5 and R6 of the transmissions T5 and T6, and subsequently, the central wireless device 102 broadcasts ranging measurement information T7 to the set of peripheral wireless devices 202-1, 202-2. In some embodiments, the central wireless device 102 processes some of the ranging measurement information provided by the peripheral wireless devices 202-1, 202-2 before sending the ranging measurement message T7 in return. As discussed previously, the ranging measurement information can be used by one or both sides to inform subsequent actions, such as to determine whether to permit entry (or other access) by a vehicular access system of the vehicle 204. When processing of ranging measurement information is required at one side, the opposite side can provide time stamp information during the time stamp exchange portion of the ranging cycle. When processing of ranging measurement information is not required at one side, the opposite side can refrain from providing the time stamp information to short the time to complete the ranging cycle.

Figure 4E:
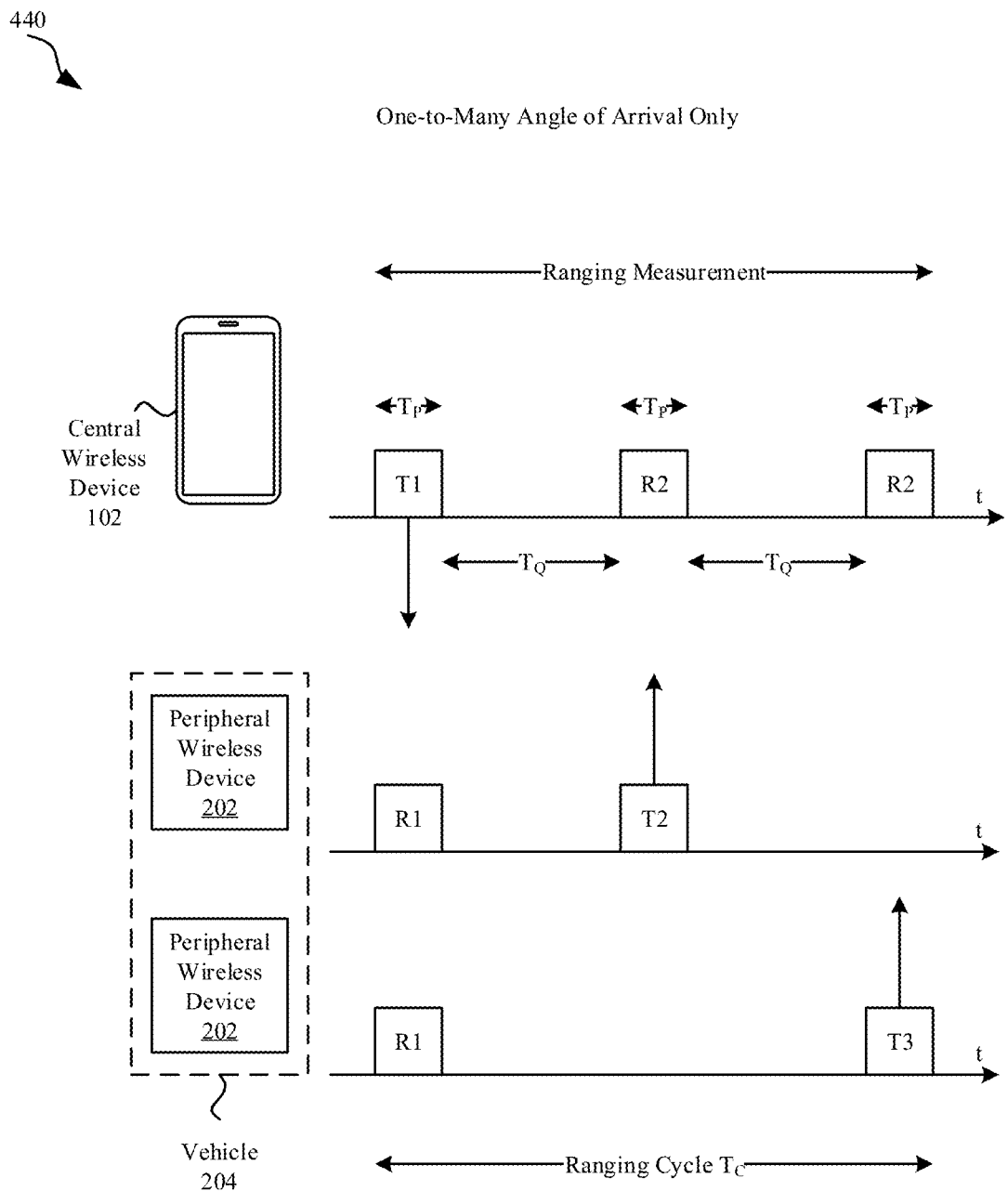

FIG. 4E illustrates a diagram 440 of another exemplary sequence of ranging messages communicated between a central wireless device 102 and two peripheral wireless devices 202-1, 202-2 used to perform a ranging measurement for angle-of-arrival only. The central wireless device 102 sends a first ranging measurement message T1 to the peripheral wireless devices 202-1, 202-2, and the peripheral wireless devices 202-1, 202-2 respond with individual ranging response messages T2 and T3 during non-overlapping, sequential time segments of a ranging cycle that spans a time interval $T_C$. The central wireless device 102 and the peripheral wireless devices 202-1, 202-2 can each determine an angle of arrival for the other side based on the reception of the ranging messages. No additional time stamp information need be exchanged for an angle of arrival only calculation.

Figure 5:
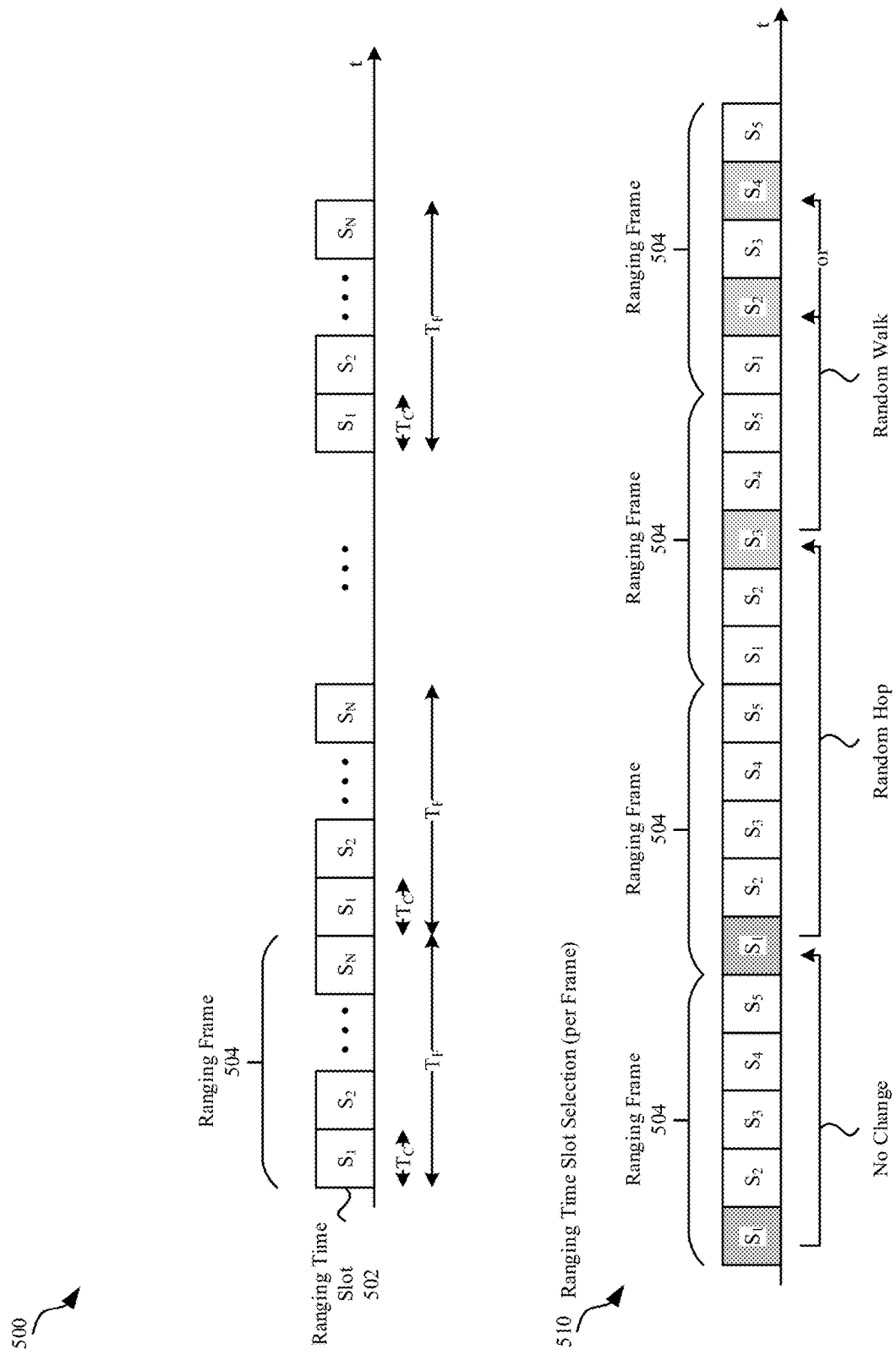
FIG. 5 illustrates an example of time slot changes between sequential ranging frames, in accordance with some embodiments.

FIG. 5 illustrates a diagram 500 of an exemplary cycle of ranging frames to subdivide a time period into distinct frames and time slots to provide flexibility for adjusting when an exchange of ranging messages can occur to mitigate interference. Each WPAN 104 used for ranging can include a central wireless device 102 in communication with one or more peripheral wireless devices 202. In some embodiments, the one or more peripheral wireless devices 202 are housed within a common system, e.g., within a vehicle 204. In some embodiments, the central wireless device 102 functions as a coordinator for communication within the WPAN 104. Different WPANs 104 can overlap in geographic area coverage resulting in interference, and each WPAN 104 can operate independently without coordination or time synchronization between them. Within each WPAN 104, the central wireless device 102 and/or the peripheral wireless devices 202 can determine whether interference exists and move ranging communication to a different time period. As shown by diagram 500 in FIG. 5, ranging communication with a WPAN 104 can operate based on a division of a time line into a sequence of ranging frames 504, each ranging frame 504 spanning a time period $T_F$. Each ranging frame 504 is divided into a sequence of ranging time slots 502, where each time slot 402 spans a time period $T_C$, which is sufficient to accommodate a complete ranging cycle including ranging measurements and any time stamp exchanges required for the WPAN 104. In some embodiments, a length of the time period $T_C$ for a ranging time slot 502 is based on the number of peripheral wireless devices 202 within the WPAN 104. In some embodiments, a length of the time period $T_C$ for a ranging time slot 502 is based on a maximum number of peripheral wireless devices 202 that can be supported within the WPAN 104, particularly for a ranging application where the central wireless device 102 can limit the number of peripheral wireless devices 202 that simultaneously can join the WPAN 104 for a ranging function. Each ranging time slot 502 is sufficiently long to allow for a complete ranging cycle between an initiating central wireless device 102 and all responding peripheral wireless devices 202. Each ranging frame 504 includes multiple (N) ranging time slots 502, where a given WPAN 104 selects only one ranging time slot 502 within a ranging frame 504 in which to perform a ranging cycle. Each WPAN 104 can select its own time slot 502 independent of any other WPAN 104, and each WPAN 104 maintains its own timing, such that ranging frames for different WPANs 104 need not be time aligned to each other.

FIG. 5 further illustrates a diagram 510 of ranging time slot 502 selection by a central wireless device 102 or a peripheral wireless device 202 within a WPAN 104. For each sequential ranging frame 504, the central wireless device 102 selects a particular ranging time slot 502 to use for a ranging cycle. The selection of which ranging time slot 502 to use for a next ranging frame 504 can be based on an estimation of interference from the current ranging frame 504 (and/or from an accumulated estimation of interference from a time window or recent ranging frames 504 or a history of ranging frames 504). Interference can be estimated by the central wireless device 102 based on signal measurements, e.g., a measurement of signal strength and/or signal quality, such as a signal-to-noise-plus-interference ratio (SINR). Interference can alternatively and/or additionally be estimated based on whether one or more peripheral wireless devices 202 responds (or had responded) to one or more ranging measurement messages broadcast by the central wireless device 102 in a current ranging frame 504 and/or in one or more preceding ranging frames 504. In some embodiments, the central wireless device 102 counts a number of responding peripheral wireless devices 202 and/or a number of measurement response messages received from peripheral wireless devices 202 to estimate at least in part interference for a ranging time slot 502 of a ranging frame 504 and selects whether to continue to use the same ranging time slot 502 in a subsequent ranging frame 504 or to change to use a different ranging time slot 502 in the subsequent ranging frame 504. As shown by the diagram 510, the same ranging time slot 502 can be used (no change), a randomly selected ranging time slot 502 can be used (random hop), or an adjacent ranging time slot 502 can be used (random walk). Whether to remain in a current ranging time slot 502, move to an adjacent ranging time slot 502, or to randomly hop to a randomly selected time slot 502 can be based on interference estimation as described further herein. The central wireless device 102 selects the ranging time slot 502 in which to initiate a ranging cycle, e.g., by broadcasting a ranging measurement message, while the peripheral wireless devices 202 similarly select a ranging time slot 502 in which to listen for messages from the central wireless device 102. Rather than listen continuously across all ranging time slots 502 of a ranging frame, the peripheral wireless devices 202 can remain in a reduced power state during non-selected ranging time slots 502 and wake to listen for messages from the central wireless device 102 only during a selected ranging time slot 502 of a ranging frame 504. Selection of which ranging time slot 502 during which to listen by the peripheral wireless devices 202 can be based on previous communication from the central wireless device 102, e.g., an indication of which ranging time slot 502 will be selected by the central wireless device 102 in a subsequent ranging frame 504, or an indication of a ranging time slot selection mode to be used by the central wireless device 102, where a ranging time slot selection mode is associated with one of the illustrated ranging time slot selections indicated by diagram 510. For example, a first mode can include no change, a second mode can include a random hop, and a third mode can include a random walk. Selection of which ranging time slot 502 during which to listen by a peripheral wireless device 202 can be based on whether communication has been received by the peripheral wireless device 202 in a selected ranging time slot 502 during a previous ranging frame 504. In some embodiments, the central wireless device 102 and the peripheral wireless devices 202 use a mutually known algorithm for random selection of a ranging time slot, e.g., a pseudo-random number generator using a seed value that is communicated between the central wireless device 102 and the peripheral wireless devices 202. Communication of the algorithm and/or the seed value can occur when establishing the WPAN 104, e.g., when a peripheral wireless device 202 joins the WPAN 104, and/or subsequently via the WPAN 104, such as in a BTLE message or a BT classic message, and/or in a ranging measurement message broadcast by the central wireless device 102. The central wireless device 102 and the peripheral wireless devices 202 can be synchronized together regarding a frame count for ranging frames 504 and therefore can know in advance, based on the random time slot selection algorithm, a random sequence of ranging time slots 502 that can be used in a sequence of ranging frames 504. While random selection of a ranging time slot 502 may be not used in each ranging frame 504, e.g., the central wireless device 102 and/or the peripheral wireless devices 202 can determine independently whether to remain in a ranging time slot 502 or to change ranging time slots 502, when random selection is used, which ranging time slot 502 to select can be known in advance for a particular ranging frame 504. In some implementations, as UWB messages are short in time duration, clear channel assessment (CCA) before transmission is not expected to be used.

Time synchronization for UWB ranging communication between the central wireless device 102 and the peripheral wireless devices 202 can be based on a coarse level of time synchronization established using an out-of-band communication, e.g., based on time information communicated using BTLE and/or BT classic for the WPAN 104. Time synchronization for UWB ranging communication can also be based on a finer level of time synchronization communicated using UWB messages, e.g., where a time stamp is included in one or more UWB messages broadcast by the central wireless device 102 to the peripheral wireless devices 202. For example, an initial ranging measurement message broadcast by the central wireless device 102 can include a time stamp that indicates a local time reference at the central wireless device 102, and peripheral wireless devices 202 that receive the broadcast initial ranging measurement message can use the time stamp included in the initial ranging measurement message to align a local time reference at the peripheral wireless device 202 to match (within a margin of error) the local time reference of the central wireless device 102. The central wireless device 102 and the peripheral wireless devices 202 can use the aligned local time references and their own internal clocks to determine time periods for a ranging time slot 502 of a ranging frame 504 (in which the initial ranging measurement message was received) and for sub-periods of the ranging time slot 502 of the ranging frame 504 during which the peripheral wireless devices 202 can respond to messages from the central wireless device 102. As discussed herein, peripheral wireless devices 202 can respond in distinct, non-overlapping segments (sub-periods) of the ranging time slot 502 in a pre-determined order (or in an order indicated by the central wireless device 102 in the initial ranging measurement message). Measurement response messages from different peripheral wireless devices 202 associated with the same central wireless device 102 will not overlap in time. Similarly, any time stamp exchange messages from the peripheral wireless devices 202 to the central wireless device 102 will not overlap in time. In some embodiments, coarse time synchronization between the central wireless device 102 and the peripheral wireless devices 202 can be refreshed, e.g., periodically, time-based, event-based, and/or on demand. Coarse time synchronization can be communicated in-band (using UWB messages) and/or out-of-band (using BTLE and/or BT Classic packets). In some embodiments, fine time synchronization is refreshed for each ranging cycle based on time stamp information included in the initial ranging measurement message received during that ranging cycle.

Figure 6:
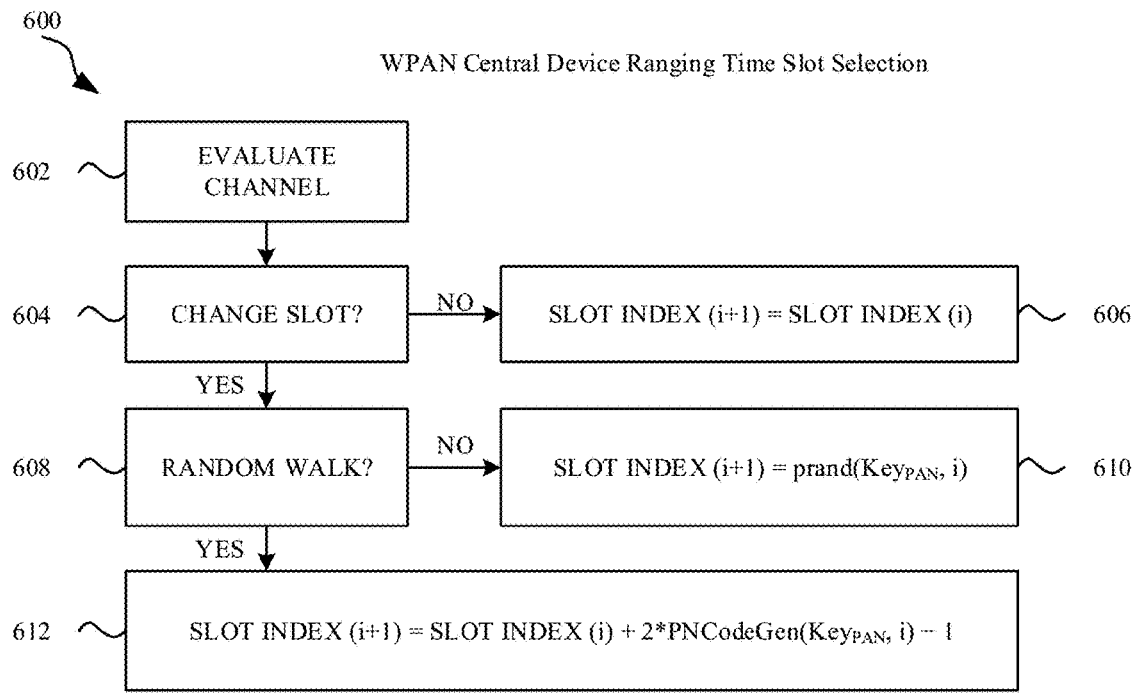
FIG. 6 illustrates an example of time slot selection for sequential ranging frames by a central wireless device, in accordance with some embodiments.
Figure 6:
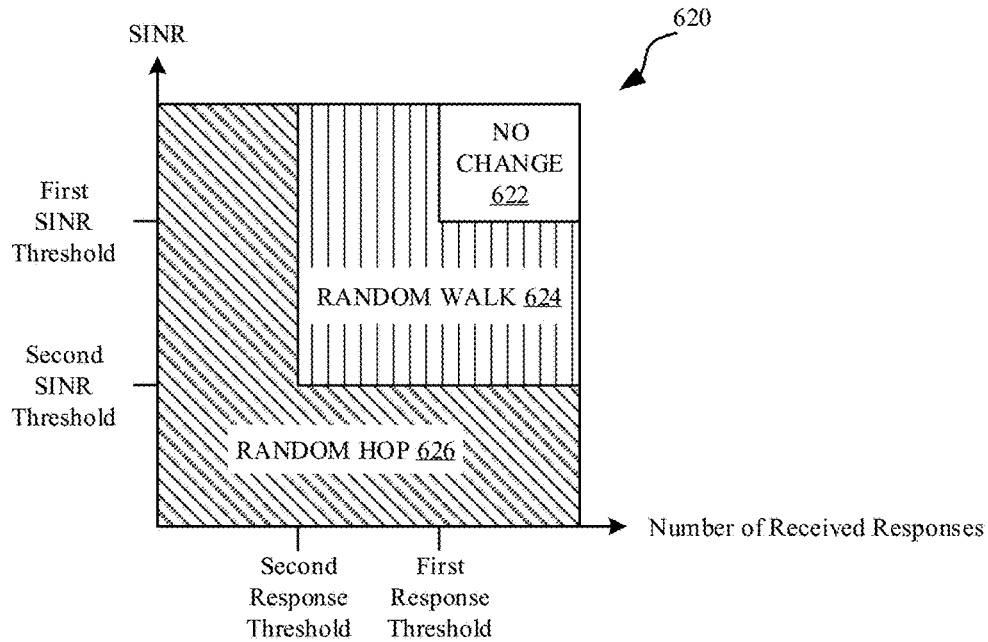

FIG. 6 illustrates a diagram 600 of an exemplary decision tree that a central wireless device 102 can use to select a ranging time slot 502 for a ranging frame 504. At 602, the central wireless device 102 evaluates a communication channel, such as to determine past levels of interference and/or responsiveness of peripheral wireless devices 202 to UWB ranging messages broadcast by the central wireless device 102. The evaluation of the communication channel at 602 can be considered an implicit clear channel assessment using previous communication results. In some embodiments, the central wireless device 102 monitors a number of responses received from peripheral wireless devices 202 and/or measures a level of signal strength and/or signal quality (e.g., an SINR) received by the central wireless device 102. The central wireless device 102 can use the monitored number of response and/or the measured SINR as inputs to one or more functions to derive a metric by which to assess the communication channel. The metric can be a combination of a function of the SINR and another function of the number of received responses. At 604, the central wireless device 102 determines whether to change to a different ranging time slot 502 in a subsequent ranging frame 504 (compared to the particular ranging time slot 502 used in the current ranging frame 504) or to remain in the same ranging time slot 502 for the subsequent ranging frame 504. Evaluation of whether to remain in the same ranging time slot 502 or to change ranging time slots 502 can be based on metrics derived from the implicit clear channel assessment of the communication channel. In some embodiments, when (i) the number of responses received from peripheral wireless devices 202 satisfies a first response threshold (which can be based on a maximum number of expected responses, such as a total number of peripheral wireless devices 202 in a given WPAN 104) and (ii) a measured SINR value satisfies a first SINR threshold, the central wireless device 102 can determine to continue to use the same ranging time slot 502 in the subsequent ranging frame 504. As indicated at 606, the index for the ranging time slot 502 (which can indicate which of a number of ranging time slots 502 in a ranging frame 504 to use) can be unchanged, i.e., the ranging time slot index in the $(i+1)^{th}$ ranging frame 504 can be the same as the ranging time slot index of the $i^{th}$ ranging frame 504. In some embodiments, when one or more thresholds for remaining in the same ranging time slot 502 is not met, e.g., when (i) the number of responses received from peripheral wireless devices 202 does not satisfy the first response threshold or (ii) the measured SINR does not satisfy the first SINR threshold, the central wireless device 102 can select a different ranging time slot 502 for the subsequent ranging frame 504. Selection of which different ranging time slot 502 can be based on a random walk (to an adjacent ranging time slot 502) or a random hop (random selection of a different ranging time slot 502). Which method to use to determine the different ranging time slot 502 can also be based on an evaluation of derived metrics. At 608, the central wireless device 102 can determine whether to use a random walk to move to an adjacent ranging time slot 502. In some embodiments, when (i) the number of responses received from peripheral wireless devices 202 satisfies a second response threshold (which can also be based on a maximum number of expected responses, such as a total number of peripheral wireless devices 202 in a given WPAN 104) and (ii) the measured SINR value satisfies a second SINR threshold, the central wireless device 102 can determine to move to a neighboring (adjacent) ranging time slot 502 in the subsequent ranging frame. At 610, the central wireless device 102 determines whether to move to a ranging time slot 502 having a higher slot index value or to a ranging time slot 502 having a lower slot index value based on output from a pseudo-random number algorithm (prand), which can use an index of the current ranging frame 504 ($i$) and a seed value $Key_{PAN}$ as inputs to generate a subsequent time slot index for the subsequent ranging frame 504 (ranging frame index i+1). In some embodiments, when one or more thresholds for moving to an adjacent ranging time slot 502 in the subsequent ranging time slot 502 is not met, e.g., when (i) the number of responses received from peripheral wireless devices 202 does not satisfy the second response threshold or (ii) the measured SINR does not satisfy the second SINR threshold, the central wireless device 102 can select a random ranging time slot 502 based at least in part on a random sequence generation algorithm (PNCodeGen), as indicated at 612.

The decision of whether to remain in the same ranging time slot (no change), move to an adjacent ranging time slot (random walk), or move to a random ranging time slot (random hop) based on two exemplary metrics, e.g., SINR and number of received responses, is illustrated as the decision block diagram 620. In a first "no change" region 622, when the number of received responses satisfies a first response threshold and the SINR satisfies a first SINR threshold, the central wireless device 102 selects the same ranging time slot 502 for the subsequent ranging frame 504 as used for the current ranging frame 504. In a second "random walk" region 624, when (i) the first "no change" region 622 conditions are not satisfied, and (ii) the number of received responses satisfies a second response threshold and the SINR satisfies a second SINR threshold, the central wireless device 102 selects an adjacent ranging time slot 502 for the subsequent ranging frame 504 based on a random walk from the ranging time slot 502 used for the current ranging frame 504. In a third "random hop" region 626, when the number of received responses does not satisfy the second response threshold or the SINR does not satisfy the second SINR threshold, the central wireless device 102 selects a random ranging time slot 502 for the subsequent ranging frame 504. The diagram 620 is provided as an exemplary embodiment only, and other decision regions and/or metrics can be used. For example, the decision of whether to change ranging time slots and/or to use a random walk or random hop can be based on a measured or estimated SINR only or can be based on a number of received responses only. Additional metrics may also be used to determine whether to remain in the current ranging time slot or to change ranging time slots.

In some embodiments, the central wireless device 102 broadcasts to the peripheral wireless devices 202 which of the three options (no change, random walk, random hop) is used to select the ranging time slot 502 for a subsequent ranging frame 504, for example during the time stamp exchange sequence of a current ranging frame 504. In some embodiments, the central wireless device 102 broadcasts to the peripheral wireless devices 202 an indication of the ranging time slot index for the selected ranging time slot 502 for the subsequent ranging frame 504, for example during the time stamp exchange sequence of a current ranging frame 504. In some embodiments, the pseudo-random number algorithm (prand) and/or the random sequence generation algorithm (PNCodeGen) and/or the seed value ($Key_{PAN}$) for the WPAN 104 that encompasses the central wireless device 102 and the peripheral wireless devices 202 can be communicated between the central wireless device 102 and the peripheral wireless devices 202 using in-band communication (e.g., in a UWB message) or using out-of-band communication (e.g., using a BTLE or BT Classic message).

Figure 7:
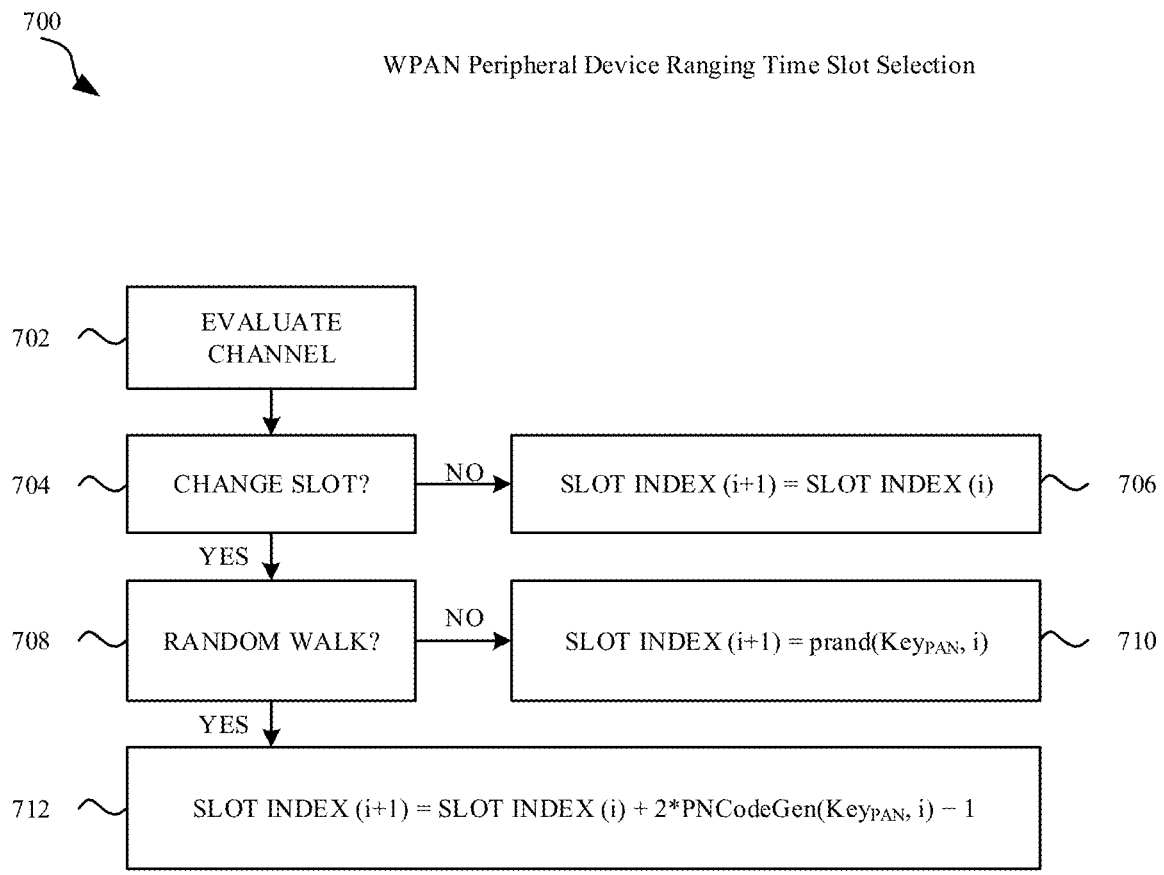
FIG. 7 illustrates an example of time slot selection for sequential ranging frames by a peripheral wireless device, in accordance with some embodiments.

FIG. 7 illustrates a diagram 700 of an exemplary decision tree that a peripheral wireless device 202 can use to select a ranging time slot 502 for a ranging frame 504. At 702, the peripheral wireless device 202 evaluates a communication channel, such as to determine past levels of interference and/or reception of messages broadcast by a central wireless device 102. In some embodiments, the peripheral wireless device 202 determines whether a UWB ranging message that concludes a ranging cycle has been received by the peripheral wireless device 202 from the central wireless device 102. In some embodiments, the peripheral wireless device 202 determines whether a UWB ranging message received from the central wireless device 102 includes an indication of an index for a ranging time slot 502 to use in a subsequent ranging frame 504 or an indication of ranging time slot change mode (e.g., where different mode indices can be used to indicate different ranging time slot changes). At 704, the peripheral wireless device 202 determines whether to change to a different ranging time slot 502 in a subsequent ranging frame 504 (compared to the particular ranging time slot 502 used in the current ranging frame 504) or to remain in the same ranging time slot 502 for the subsequent ranging frame 504. Evaluation of whether to remain in the same ranging time slot 502 or to change ranging time slots 502 can be based on whether a UWB ranging message has been received that indicates a ranging time slot index or mode for changing ranging time slots 502. In some embodiments, when a UWB ranging message is received from the central wireless device 102, the UWB ranging message indicating no ranging time slot index change for the subsequent ranging frame 504 (or repeats a current ranging time slot index to be used for the subsequent ranging frame 504 as used for the current ranging frame 504), the peripheral wireless device 202 can determine to continue to use the same ranging time slot 502 in the subsequent ranging frame 504. As indicated at 706, the index for the ranging time slot 502 (which can indicate which of a number of ranging time slots 502 in a ranging frame 504 to use) can be unchanged, i.e., the ranging time slot index in the $(i+1)^{th}$ ranging frame 504 can be the same as the ranging time slot index of the $i^{th}$ ranging frame 504. In some embodiments, when the peripheral wireless device 202 receives, from the central wireless device 102, a UWB ranging message that includes an indication of a change in ranging time slot 502 (e.g., a mode indication) or a designation of a different ranging time slot 502 to be used for a subsequent ranging frame 504, the peripheral wireless device 202 can select a different ranging time slot 502 for the subsequent ranging frame 504. At 708, the peripheral wireless device 202 can determine whether to use a random walk to move to an adjacent ranging time slot 502. In some embodiments, when receiving a UWB ranging message from the central wireless device 102 indicating a random walk mode, the peripheral wireless device 202 can determine to move to a neighboring (adjacent) ranging time slot 502 in the subsequent ranging frame. At 710, the peripheral wireless device 202 determines whether to move to a ranging time slot 502 having a higher slot index value or to a ranging time slot 502 having a lower slot index value based on output from a pseudo-random number algorithm (prand), which can use an index of the current ranging frame 504 ($i$) and a seed value $Key_{PAN}$ as inputs to generate a subsequent time slot index for the subsequent ranging frame 504 (ranging frame index i+1). In some embodiments, the central wireless device 102 indicates the ranging time slot index value directly, and the peripheral wireless device 202 need not compute the ranging time slot index value. In some embodiments, when receiving a UWB ranging message from the central wireless device 102 indicating that a random hop should be used to determine the ranging time slot 502 of the subsequent ranging frame 504, the peripheral wireless device 202 can select a random ranging time slot 502 based at least in part on a random sequence generation algorithm (PNCodeGen), as indicated at 712. In some embodiments, the central wireless device 102 broadcasts to the peripheral wireless devices 202 which of the three options (no change, random walk, random hop) is used to select the ranging time slot 502 for a subsequent ranging frame 504, for example during the time stamp exchange sequence of a current ranging frame 504. In some embodiments, the central wireless device 102 broadcasts to the peripheral wireless devices 202 an indication of the ranging time slot index for the selected ranging time slot 502 for the subsequent ranging frame 504. In some embodiments, when the peripheral wireless device 202 does not receive a UWB ranging message from the central wireless device indicating a ranging time slot index mode change or a particular time slot index to use for a subsequent ranging frame 504, the peripheral wireless device 202 determines the ranging time slot index according to a random hop, as in 712. In some embodiments, the pseudo-random number algorithm (prand) and/or the random sequence generation algorithm (PNCodeGen) and/or the seed value ($Key_{PAN}$) for the WPAN 104 that encompasses the central wireless device 102 and the peripheral wireless devices 202 can be communicated between the central wireless device 102 and the peripheral wireless devices 202 using in-band communication (e.g., in a UWB message) or using out-of-band communication (e.g., using a BTLE or BT Classic message).

Figure 8A:
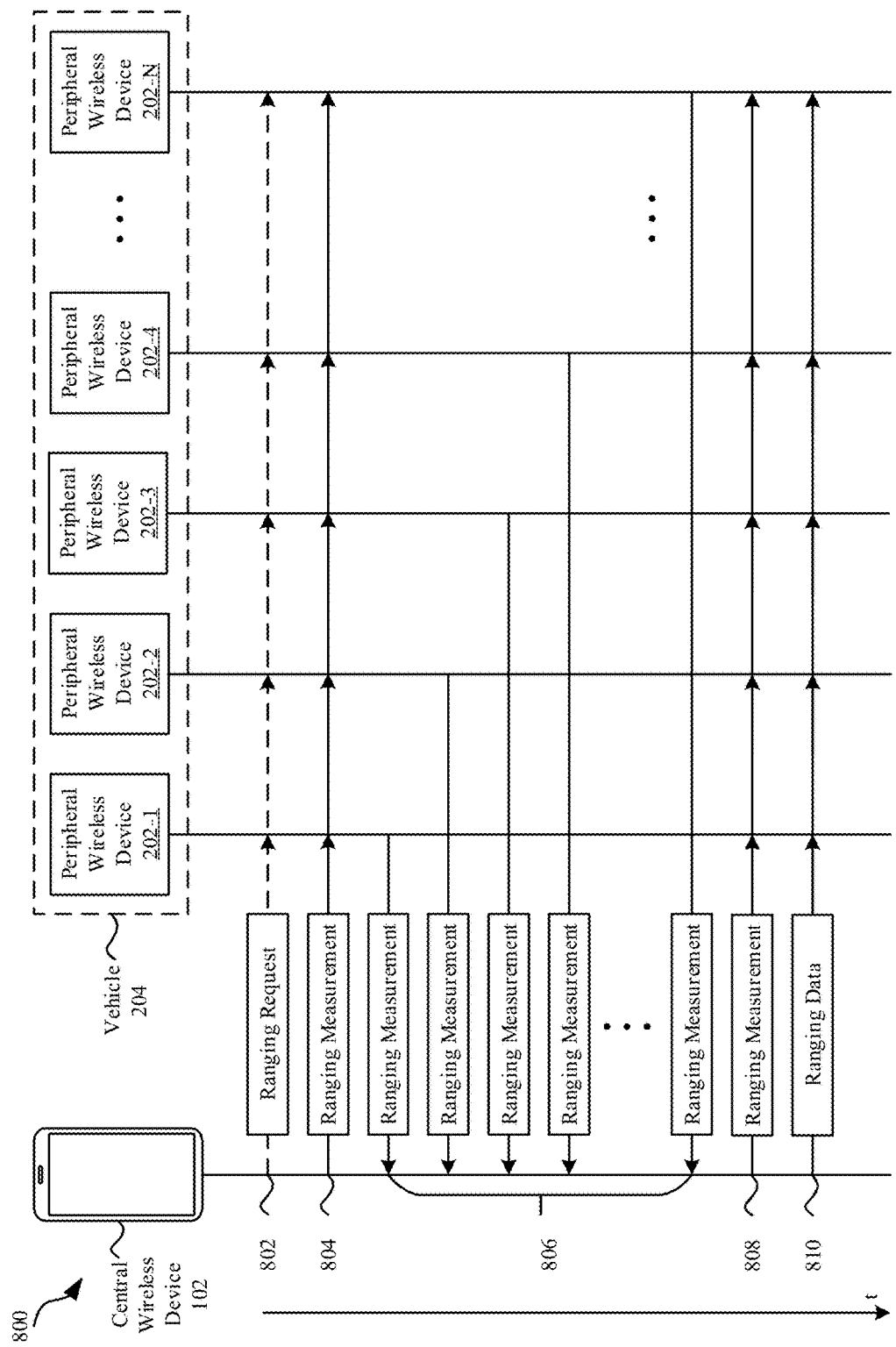
FIGS. 8A and 8B illustrate an example of a ranging measurement sequence between a wireless device and multiple peripheral wireless devices, in accordance with some embodiments.

FIG. 8A illustrates a diagram 800 of ranging by a central wireless device 102 in communication with a set of peripheral wireless devices 202-1 to 202-N housed in a vehicle 204. Initially, at 802, the central wireless device 102 broadcasts a ranging request message to the set of peripheral wireless devices 202-1 to 202-N. Communication of the ranging request message can be optional, in some embodiments. The ranging request message can include an indication of parameters for a ranging cycle, such as an indication of one or more random ranging time slot selection algorithms, an indication of seed values for the one or more random ranging time slot selection algorithms, and/or an indication of an ordering responses from the set of peripheral wireless devices 202-1 to 202-N. In some embodiments, the ranging request message can be communicated using a wireless communication protocol of a WPAN 104, such as via BTLE or BT Classic. The ranging request message can be communicated at a time that is separated from the remaining ranging messages illustrated for a ranging cycle. At 804, the central wireless device 102 broadcasts to the set of peripheral wireless devices 202-1 to 202-N a first ranging measurement message. The first ranging measurement message can include a time stamp value indicating when the first ranging measurement message is sent by which each peripheral wireless device 202-1 to 202-N can align their respective local time references to be synchronized with a time reference of central wireless device 102. At 806, each of the peripheral wireless devices 202-1 to 202-N respond to the first ranging measurement message with individual, non-overlapping ranging measurement responses. The ranging measurement responses can also include time stamp values for when the ranging measurement response messages are transmitted by their respective peripheral wireless device 202-1 to 202-N. At 808, the central wireless device 102 broadcasts a second ranging measurement message to the set of peripheral wireless devices 202-1 to 202-N. The set of peripheral wireless devices 202-1 to 202-N can use the first and second ranging measurement messages to determine ranging values, e.g., time-of-flight estimates, distance estimates, angle-of-arrival estimates, or the like. The central wireless device 102 can use the ranging measurement responses to determine its own set of ranging values. At 810, the central wireless device 102 broadcasts ranging measurement data, e.g., time stamp exchange information, to the set of peripheral wireless devices 202-1 to 202-N. The set of peripheral wireless devices 202-1 to 202-N can be communicate with a centralized controller to determine whether to permit vehicle entry access based on the ranging measurements made by the peripheral wireless devices 202-1 to 202-N and/or the ranging measurement data received by the peripheral wireless devices 202-1 to 202-N from the central wireless device 102.

Figure 8B:
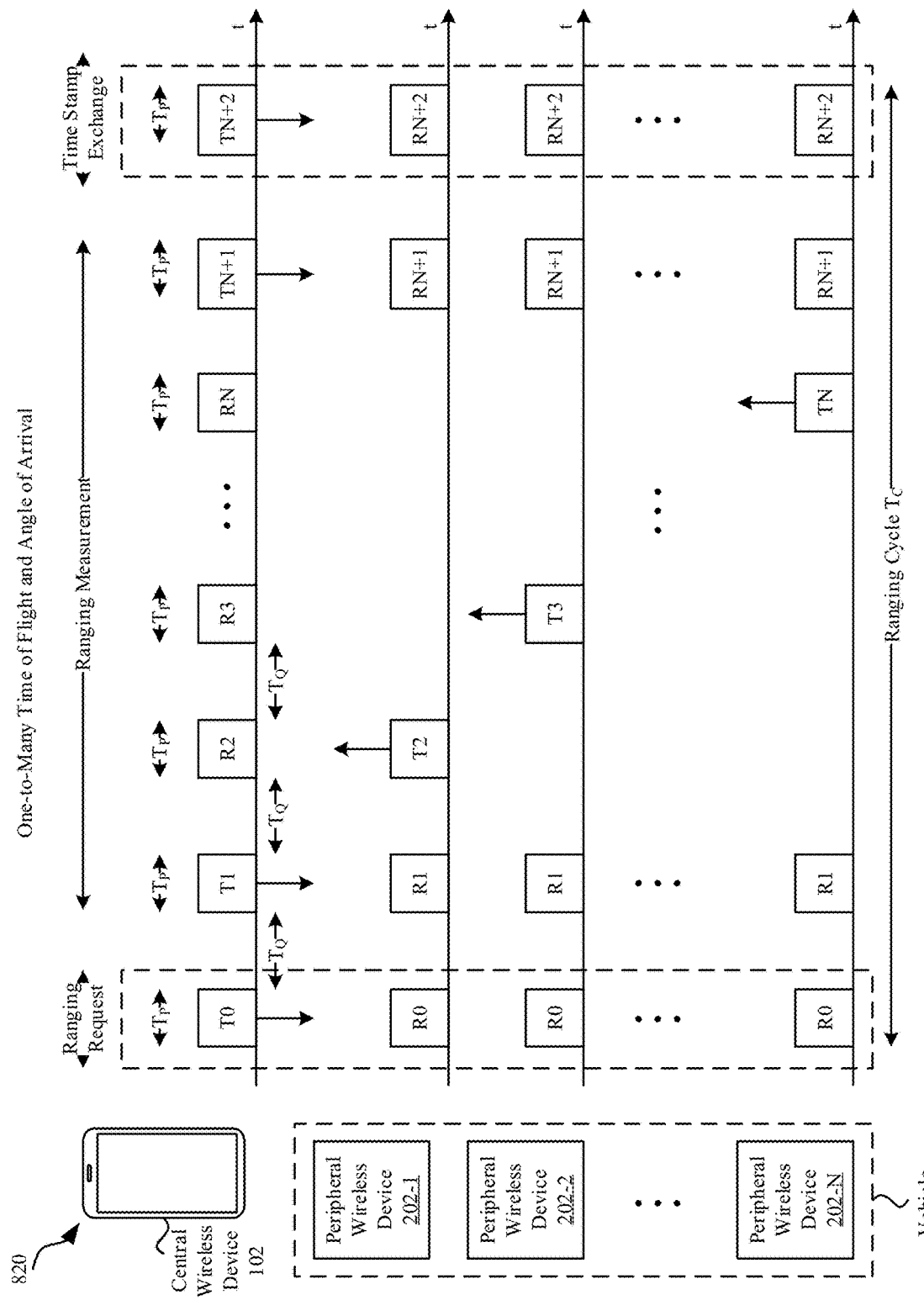

FIG. 8B illustrates a diagram 820 that corresponds, in some embodiments, to the diagram 800 of FIG. 8A of ranging by a central wireless device 102 in communication with a set of peripheral wireless devices 202-1 to 202-N housed in a vehicle 204. The ranging request message can be communicated by a central wireless device 102 as the UWB message T0 and received by the set of peripheral wireless devices 202-1 to 202-N as R0. The ranging measurement can include the first ranging measurement UWB message T1 broadcast to the set of peripheral wireless devices 202-1 to 202-N, which respond by sending ranging measurement responses T2 to TN in non-overlapping, sequential, predetermined time segments to the central wireless device 102.

The central wireless device 102 broadcasts the second ranging measurement message TN+1, which is received by the set of peripheral wireless devices 202-1 to 202-N at R2 to RN. Subsequently, the central wireless device 102 broadcasts ranging measurement data in a UWB message TN+2, which is received by the set of peripheral wireless devices 202-1 to 202-N at RN+2 as part of the time stamp exchange. The ranging measurement data can be used by the set of peripheral wireless devices 202-1 to 202-N (e.g., in conjunction with a controller of the vehicle 204) to determine whether to perform various actions, such as whether to permit vehicle access.

Figure 9A:
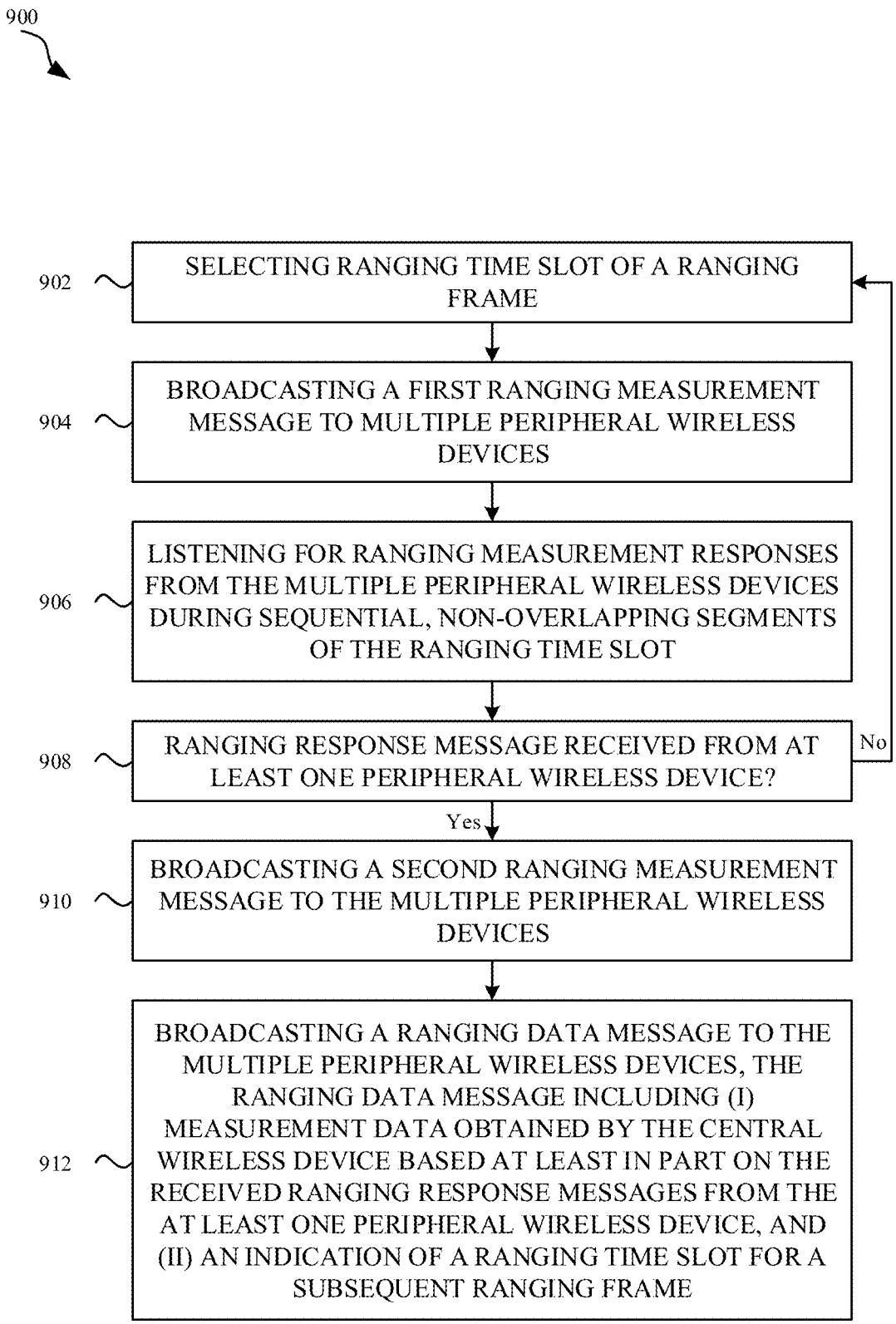
FIG. 9A illustrates a diagram of an exemplary method for coordinated channel access by a central wireless device in communication with multiple peripheral wireless devices, in accordance with some embodiments.

FIG. 9A illustrates a diagram 900 of an exemplary method for performing a ranging operation by a central wireless device 102 in communication with multiple peripheral wireless devices 202. At 902, the central wireless device 102 selects a ranging time slot 502 to use for a ranging frame 504. At 904, the central wireless device 102 broadcasts a first ranging measurement message to the multiple peripheral wireless devices 202. At 906, the central wireless device 102 listens for ranging measurement responses from each of the multiple peripheral wireless devices 202 during sequential, non-overlapping segments of the ranging time slot. At 908, the central wireless device 102 determines whether a ranging response message has been received from at least one of the multiple peripheral wireless devices 202. When no ranging response messages have been received from the multiple peripheral wireless devices 202, the central wireless device 102 returns to 902 to determine another ranging time slot 502 to use for a subsequent ranging frame 504 to then repeat the ranging cycle. When at least one ranging response message has been received from at least one of the multiple peripheral wireless devices 202, the central wireless device 102, at 910, broadcasts a second ranging measurement message to the multiple peripheral wireless devices 202. Subsequently, at 912, the central wireless device 102 broadcasts a ranging data message to the multiple peripheral wireless devices 202, the ranging data message including (i) measurement data obtained by the central wireless device 102 based at least in part on the at least one ranging response message received from one or more of the multiple peripheral wireless devices 202, and (ii) an indication of a ranging time slot 502 to be used for a subsequent ranging frame 504.

In some embodiments, the method performed by the central wireless device 102 further includes the central wireless device 102 selecting the ranging time slot for ranging in the subsequent ranging frame based at least in part on at least one of (i) an estimate of a signal-to-noise-plus-interference ratio (SINR), or (ii) a number of ranging measurement responses the central wireless device 102 received during the first ranging frame. In some embodiments, the central wireless device 102 selects the ranging time slot for ranging in the subsequent ranging frame by at least: (i) using an identical ranging time slot index for the subsequent ranging frame as for the first ranging frame when a number of ranging measurement responses satisfies (e.g., equals or exceeds) a first response threshold; (ii) using a neighboring ranging time slot index for the subsequent ranging frame when the number of ranging measurement responses does not satisfy (e.g., does not equal or exceed) the first response threshold and satisfies (e.g., equals or exceeds) a second response threshold; and (iii) using a randomly selected ranging time slot index for the subsequent ranging frame when the number of ranging measurement responses does not satisfy (e.g., does not equal or exceed) the second response threshold. In some embodiments, the first ranging measurement message includes a time stamp value indicating when the first ranging measurement message is broadcast by the central wireless device. In some embodiments, the central wireless device 102, prior to broadcasting the first ranging measurement message, broadcasts a ranging initiation message to the multiple peripheral wireless devices, the ranging initiation message including an indication of a ranging time slot index for the first ranging frame. In some embodiments, the central wireless device 102, prior to broadcasting the first ranging measurement message, communicates a cryptographic key to be used by the central wireless device and the peripheral wireless devices with a random number generator to determine a random hopping pattern of ranging time slot indexes for a sequence of ranging frames. In some embodiments, the cryptographic key is broadcast using a Bluetooth Low Energy (BTLE) personal area network wireless communication protocol; and the ranging measurement messages, the ranging measurement responses, and the ranging data message are communicated using an ultra-wideband (UWB) wireless communication protocol. In some embodiments, the method performed by the central wireless device 102 further includes the central wireless device 102, when receiving no ranging measurement responses from the multiple peripheral wireless devices during the selected ranging time slot of the first ranging frame and the selected ranging time slot is not the final ranging time slot of the first ranging frame, reattempting a ranging measurement with the plurality of peripheral wireless devices in a subsequent ranging time slot of the first ranging frame. In some embodiments, measurement data includes one or more time stamp values indicating when the central wireless device received the one or more ranging measurement responses. In some embodiments, the indication of the ranging time slot selected for ranging in the subsequent ranging frame includes a ranging time slot index. In some embodiments, the indication of the ranging time slot selected for ranging in the subsequent ranging frame includes an indication whether to reuse the identical ranging time slot, to move to an adjacent ranging time slot, or to select a random ranging time slot in the subsequent ranging frame.

Figure 9B:
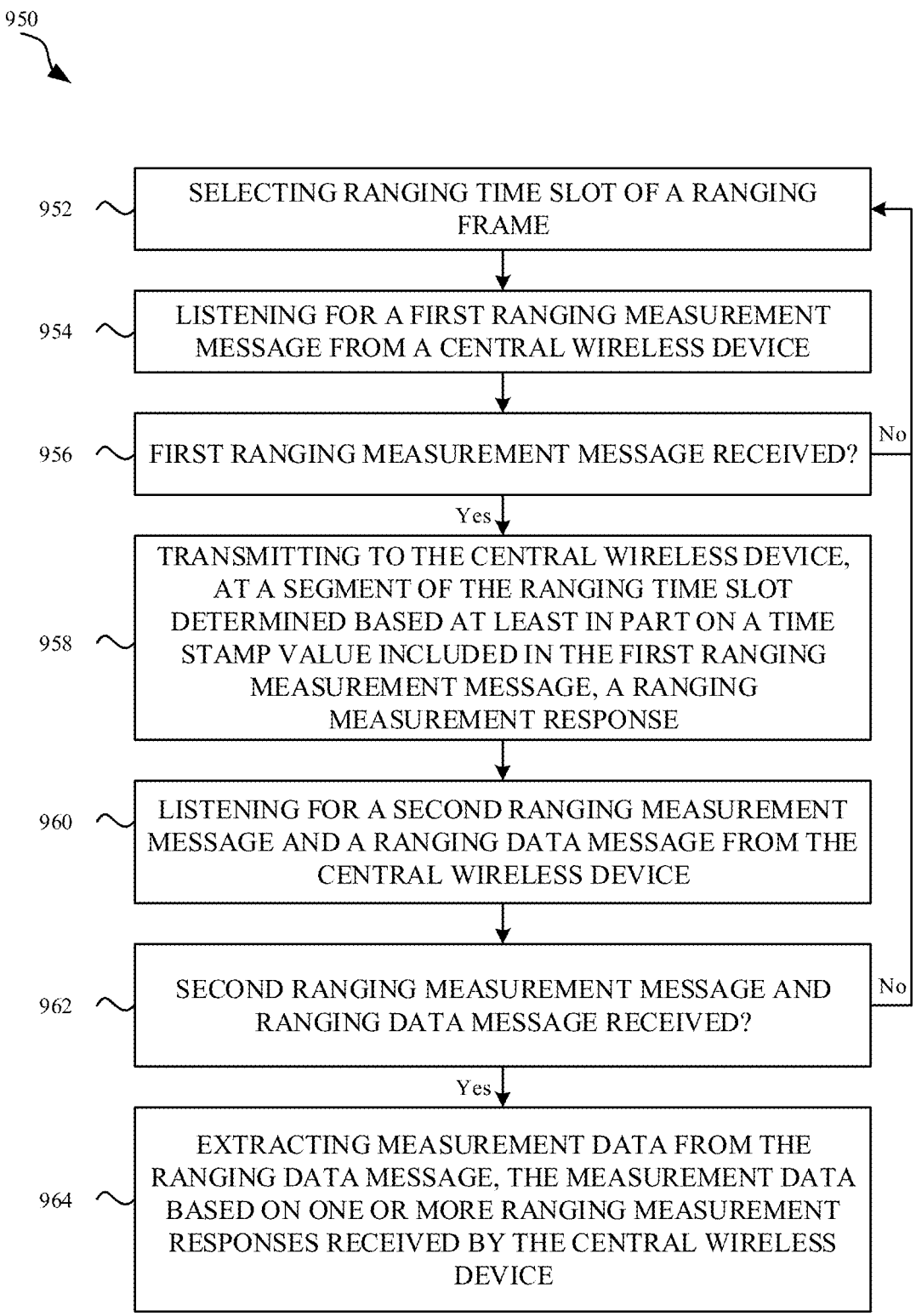
FIG. 9B illustrates a diagram of an exemplary method for coordinated channel access by a peripheral wireless device in communication with a central wireless device, in accordance with some embodiments.

FIG. 9B illustrates a diagram 950 of an exemplary method for performing a ranging operation by a peripheral wireless device 202 (of a set of multiple peripheral wireless devices 202) in communication with a central wireless device 102. At 952, the peripheral wireless device 202 selects a ranging time slot 502 to use for a ranging frame 504. At 954, the peripheral wireless device 202 listens for a first ranging measurement message from the central wireless device 102 during the selected ranging time slot 502 of the ranging frame 504. At 956, the peripheral wireless device 202 determines whether the first ranging measurement message is received from the central wireless device 102. When the first ranging measurement message is not received during the selected ranging time slot 502 of the ranging frame 504, the peripheral wireless device 202 returns to 952 to select another ranging time slot 502 for a subsequent ranging frame 504. When the first ranging measurement message is received during the selected ranging time slot 502 of the ranging frame 504, at 958, the peripheral wireless device 202 transmits to the central wireless device 102, during a segment of the ranging time slot 502, a ranging measurement response message. The segment of the ranging time slot 502 can be based on a time stamp value included in the ranging measurement message received from the central wireless device 102, where the time stamp value can be used to align a local time reference of the peripheral wireless device 202. The segment of the ranging time slot 502 can also be based on an order in which different peripheral wireless devices 202 associated with the central wireless device 102 are determined to communicate so that transmissions by different peripheral wireless devices 202 in the same ranging time slot 502 do not overlap in time. At 960, the peripheral wireless device 202 listens for a second ranging measurement message and a ranging data message from the central wireless device 102. At 962, the peripheral wireless device 202 determines whether the second ranging measurement message and the ranging data message have been received from the central wireless device 102. When the second ranging measurement message or the ranging data message are not received from the central wireless device 102, the peripheral wireless device 202 can return to 952 to select another ranging time slot 502 for a subsequent ranging frame 504. When both the second ranging measurement message and the ranging data message are received from the central wireless device 102, the peripheral wireless device 202 at 964 extracts measurement data from the second ranging message, where the measurement data is based at least in part on ranging measurement responses received by the central wireless device 102. In some embodiments, the peripheral wireless device 202 can select a ranging time slot 502 for a subsequent ranging frame 504.

In some embodiments, the peripheral wireless device 202 selects the ranging time slot for ranging in the subsequent ranging frame is based at least in part on an indication of a ranging time slot selected by the central wireless device 102 for ranging in the subsequent ranging frame and included in the ranging data message. In some embodiments, the indication of the ranging time slot selected by the central wireless device includes one of: an indication to use an identical ranging time slot index for the subsequent ranging frame as used for the first ranging frame, an indication to use a neighboring ranging time slot index, or an indication to use a randomly selected ranging time slot index. In some embodiments, the method performed by the peripheral wireless device 202 further includes, after receipt of the first ranging measurement message and responsive to no receipt of the second ranging measurement message or the ranging data message, selecting the ranging time slot for ranging in the subsequent ranging frame based on a randomly selected ranging time slot index for the subsequent ranging frame. In some embodiments, the first ranging measurement message includes a ranging time stamp value indicating when the first ranging measurement message is broadcast by the central wireless device. In some embodiments, the method performed by the peripheral wireless device 202 further includes the peripheral wireless device 202, prior to listening for the first ranging measurement message, receiving a ranging initiation message from the central wireless device, the ranging initiation message including an indication of a ranging time slot index for the first ranging frame. In some embodiments, the method performed by the peripheral wireless device 202 further includes the peripheral wireless device 202, prior to listening for the first ranging measurement message, receiving from the central wireless device a cryptographic key to be used by the central wireless device and the peripheral wireless device with a random number generator to determine a random hopping pattern of ranging time slot indexes for a sequence of ranging frames. In some embodiments, the cryptographic key is broadcast using a Bluetooth Low Energy (BTLE) personal area network wireless communication protocol; and the ranging measurement messages, the ranging measurement responses, and the ranging data message are communicated using an ultra-wideband (UWB) wireless communication protocol.

Figure 10:
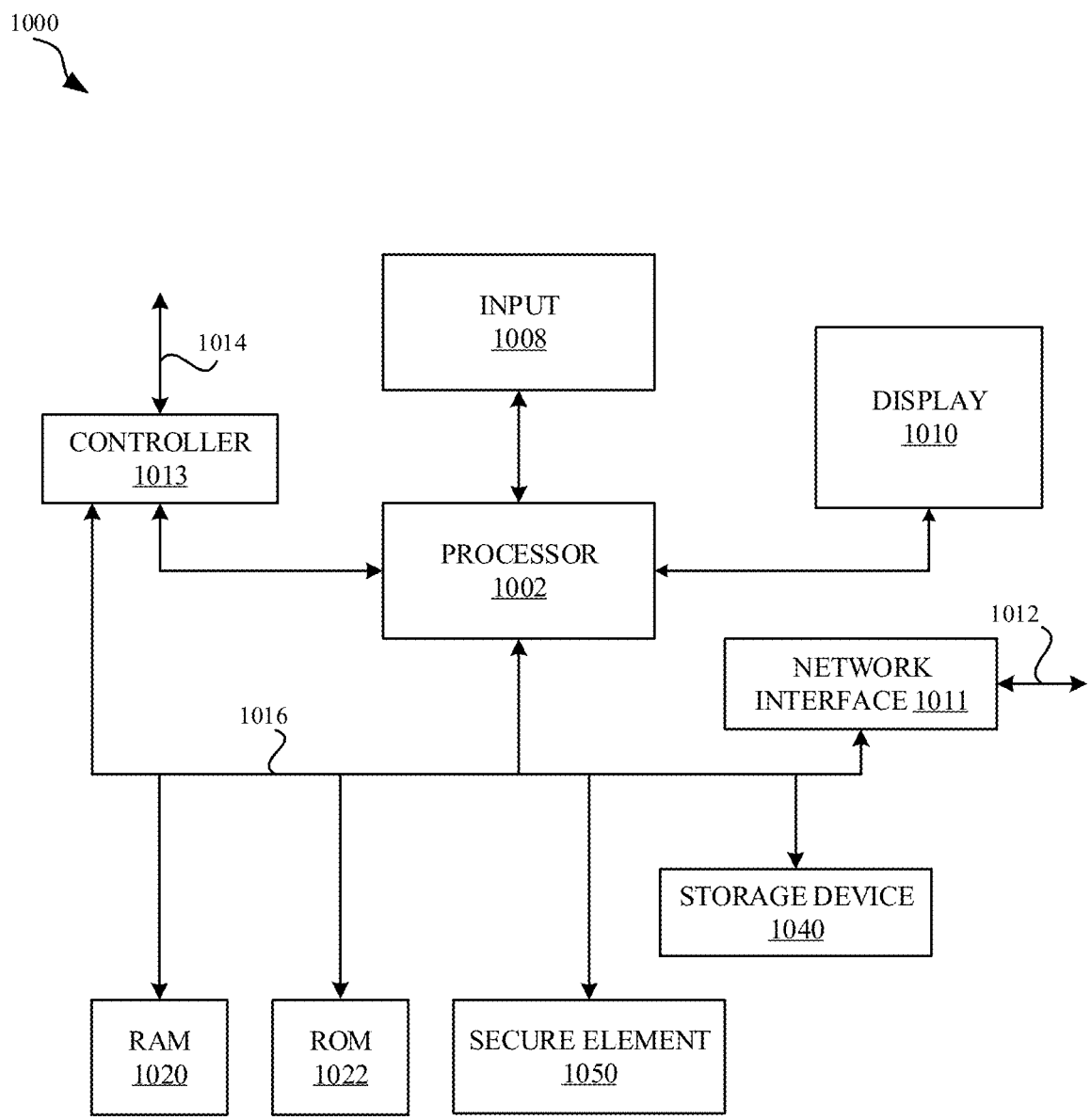
FIG. 10 illustrates an exemplary apparatus for implementation of embodiments disclosed herein, in accordance with some embodiments.

FIG. 10 illustrates a detailed view of a representative computing device 1000 that can be used to implement various methods described herein, according to some embodiments. In particular, the detailed view illustrates various components that can be included in the central wireless device 102. As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 that can be controlled by the processor 1002 to display information to the user. A data bus 1016 can facilitate data transfer between at least a storage device 1040, the processor 1002, and a controller 1013. The controller 1013 can be used to interface with and control different equipment through an equipment control bus 1014. The computing device 1000 can also include a network/bus interface 1011 that communicatively couples to a data link 1012. In the case of a wireless connection, the network/bus interface 1011 can include a wireless transceiver.

The computing device 1000 also includes a storage device 1040, which can comprise a single disk or a plurality of disks (e.g., hard drives), and includes a storage management module that manages one or more partitions within the storage device 1040. In some embodiments, storage device 1040 can include flash memory, semiconductor (solid state) memory or the like. The computing device 1000 can also include a Random Access Memory (RAM) 1020 and a Read-Only Memory (ROM) 1022. The ROM 1022 can store programs, utilities or processes to be executed in a non-volatile manner. The RAM 1020 can provide volatile data storage, and stores instructions related to the operation of the computing device 1000. The computing device 1000 can further include a secure element (SE) 1050, which can represent secure storage for cellular wireless system access by the central wireless device 102.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future next generation (NG) developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device can be configured to prefer attachment to LTE networks offering faster data rate throughput, as compared to other 3G legacy networks offering lower data rate throughputs. For instance, in some implementations, a multi-mode wireless device may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for performing a ranging operation by a central wireless device communicating with a plurality of peripheral wireless devices, the method comprising:
by the central wireless device, during a selected ranging time slot of a first ranging frame comprising a plurality of non-overlapping, indexed time slots:
broadcasting a first ranging measurement message to the plurality of peripheral wireless devices;
listening for ranging measurement responses from the plurality of peripheral wireless devices during sequential non-overlapping segments of the selected ranging time slot; and
responsive to receiving one or more ranging measurement responses from at least one of the plurality of peripheral wireless devices:
broadcasting a second ranging measurement message to the plurality of peripheral wireless devices; and
broadcasting to the plurality of peripheral wireless devices a ranging data message that includes:
measurement data obtained by the central wireless device based at least in part on the received one or more ranging measurement responses, and
an indication of a ranging time slot selected for ranging in a subsequent ranging frame.

2. The method of claim 1, further comprising:
by the central wireless device:
selecting the ranging time slot for ranging in the subsequent ranging frame based at least in part on at least one of (i) an estimate of a signal-to-noise plus interference ratio (SINK), or (ii) a number of ranging measurement responses the central wireless device received during the first ranging frame.

3. The method of claim 2, wherein the selecting the ranging time slot for ranging in the subsequent ranging frame further comprises:
using an identical ranging time slot index for the subsequent ranging frame as for the first ranging frame when the number of ranging measurement responses satisfies a first response threshold;
using a neighboring ranging time slot index for the subsequent ranging frame when the number of ranging measurement responses does not satisfy the first response threshold and satisfies a second response threshold; and
using a randomly selected ranging time slot index for the subsequent ranging frame when the number of ranging measurement responses does not satisfy the second response threshold.

4. The method of claim 1, wherein the first ranging measurement message includes a time stamp value indicating when the first ranging measurement message is broadcast by the central wireless device.

5. The method of claim 1, further comprising:
by the central wireless device, prior to broadcasting the first ranging measurement message:
broadcasting a ranging initiation message to the plurality of peripheral wireless devices, the ranging initiation message comprising an indication of a ranging time slot index for the first ranging frame.

6. The method of claim 1, further comprising:
by the central wireless device, prior to broadcasting the first ranging measurement message:
communicating a cryptographic key to be used, with a random number generator, by the central wireless device and the plurality of peripheral wireless devices to determine a random hopping pattern of ranging time slot indexes for a sequence of ranging frames.

7. The method of claim 6, wherein:
the cryptographic key is broadcast using a Bluetooth Low Energy (BTLE) personal area network wireless communication protocol; and
the ranging measurement messages, the ranging measurement responses, and the ranging data message are communicated using an ultra-wideband (UWB) wireless communication protocol.

8. The method of claim 1, further comprising:
by the central wireless device, when receiving no ranging measurement responses from the plurality of peripheral wireless devices during the selected ranging time slot of the first ranging frame and the selected ranging time slot is not a final ranging time slot of the first ranging frame, reattempting a ranging measurement with the plurality of peripheral wireless devices in a subsequent ranging time slot of the first ranging frame.

9. The method of claim 1, wherein the measurement data comprises one or more time stamp values indicating when the central wireless device received the one or more ranging measurement responses.

10. The method of claim 1, wherein the indication of the ranging time slot selected for ranging in the subsequent ranging frame comprises a ranging time slot index.

11. The method of claim 1, wherein the indication of the ranging time slot selected for ranging in the subsequent ranging frame comprises an indication whether to reuse an identical ranging time slot, to move to an adjacent ranging time slot, or to select a random ranging time slot in the subsequent ranging frame.

12. A method for performing a ranging operation by a peripheral wireless device of a plurality of peripheral wireless devices communicating with a central wireless device, the method comprising:
by the peripheral wireless device, during a selected ranging time slot of a first ranging frame comprising a plurality of non-overlapping, indexed ranging time slots:
listening for a first ranging measurement message from the central wireless device; and
responsive to receiving the first ranging measurement message:
transmitting to the central wireless device, at a segment of the selected ranging time slot of the first ranging frame based at least in part on a time stamp value included in the first ranging measurement message, a ranging measurement response;
listening for a second ranging measurement message and a ranging data message from the central wireless device; and
responsive to receiving the second ranging measurement message and the ranging data message:
extracting, from the ranging data message, measurement data obtained by the central wireless device that is based at least in part on one or more ranging measurement responses received from one or more peripheral wireless devices of the plurality of peripheral wireless devices, and
selecting a ranging time slot for ranging in a subsequent ranging frame.

13. The method of claim 12, wherein selecting the ranging time slot for ranging in the subsequent ranging frame is based at least in part on an indication of a ranging time slot in the subsequent ranging frame, wherein the ranging time slot is selected by the central wireless device for ranging and is included in the ranging data message.

14. The method of claim 13, wherein the indication of the ranging time slot selected by the central wireless device comprises one of:
an indication to use an identical ranging time slot index as used for the first ranging frame,
an indication to use a neighboring ranging time slot index, or
an indication to use a randomly selected ranging time slot index.

15. The method of claim 12, further comprising:
by the peripheral wireless device, after receipt of the first ranging measurement message and responsive to no receipt of the second ranging measurement message or the ranging data message:
selecting the ranging time slot for ranging in the subsequent ranging frame based on a randomly selected ranging time slot index for the subsequent ranging frame.

16. The method of claim 12, wherein the first ranging measurement message includes a ranging time stamp value indicating when the first ranging measurement message is broadcast by the central wireless device.

17. The method of claim 12, further comprising:
by the peripheral wireless device, prior to listening for the first ranging measurement message:
receiving a ranging initiation message from the central wireless device, the ranging initiation message comprising an indication of a ranging time slot index for the first ranging frame.

18. The method of claim 12, further comprising:
by the peripheral wireless device, prior to listening for the first ranging measurement message:
receiving from the central wireless device a cryptographic key to be used, with a random number generator, by the central wireless device and the peripheral wireless device to determine a random hopping pattern of ranging time slot indexes for a sequence of ranging frames.

19. The method of claim 18, wherein:
the cryptographic key is broadcast using a Bluetooth Low Energy (BTLE) personal area network wireless communication protocol; and
the ranging measurement messages, the ranging measurement responses, and the ranging data message are communicated using an ultra-wideband (UWB) wireless communication protocol.

20. A central wireless device comprising:
processing circuitry comprising one or more processors and a memory storing instructions that, when executed by the one or more processors, cause the central wireless device to perform actions that include:
during a selected ranging time slot of a first ranging frame comprising a plurality of non-overlapping, indexed ranging time slots:
broadcasting a first ranging measurement message to a plurality of peripheral wireless devices;
listening, during sequential non-overlapping segments of the selected ranging time slot, for ranging measurement responses from one or more peripheral wireless devices of the plurality of peripheral wireless devices; and
responsive to receiving at least one ranging measurement response from at least one of the plurality of peripheral wireless devices:

broadcasting a second ranging measurement message to the plurality of peripheral wireless devices; and broadcasting to the plurality of peripheral wireless devices a ranging data message that includes:
  measurement data obtained by the central wireless device based at least in part on the at least one ranging measurement response, and
  an indication of a ranging time slot selected for ranging in a subsequent ranging frame.

* * * * *

UNITED STATES PATENT AND TRADEMARK OFFICE
CERTIFICATE OF CORRECTION

PATENT NO. : 10,652,925 B2
APPLICATION NO. : 16/140992
DATED : May 12, 2020
INVENTOR(S) : Naguib et al.

Page 1 of 1

It is certified that error appears in the above-identified patent and that said Letters Patent is hereby corrected as shown below:

In the Claims

In Claim 2, at Column 24, Line 32: "ratio (SINK), or (ii) a number of ranging measurement" should read -- ratio (SINR), or (ii) a number of ranging measurement --.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*